United States Patent
Louis

(10) Patent No.: US 12,202,940 B2
(45) Date of Patent: Jan. 21, 2025

(54) POLY (ETHER KETONE KETONE) POLYMERS, CORRESPONDING SYNTHESIS METHODS AND POLYMER COMPOSITIONS AND ARTICLES MADE THEREFROM

(71) Applicant: SOLVAY SPECIALTY POLYMERS USA, LLC, Alpharetta, GA (US)

(72) Inventor: Chantal Louis, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 18/460,404

(22) Filed: Sep. 1, 2023

(65) Prior Publication Data

US 2023/0416461 A1     Dec. 28, 2023

Related U.S. Application Data

(62) Division of application No. 16/471,536, filed as application No. PCT/EP2017/083676 on Dec. 19, 2017, now Pat. No. 11,780,962.

(60) Provisional application No. 62/456,941, filed on Feb. 9, 2017, provisional application No. 62/437,300, filed on Dec. 21, 2016.

(30) Foreign Application Priority Data

May 3, 2017 (EP) ..................... 17169170

(51) Int. Cl.
    C08G 65/40       (2006.01)
(52) U.S. Cl.
    CPC ..... C08G 65/4012 (2013.01); C08G 65/4093 (2013.01); C08G 2650/40 (2013.01)
(58) Field of Classification Search
    CPC .................................................. C08G 65/4012
    See application file for complete search history.

(56) References Cited

U.S. PATENT DOCUMENTS

| | | | |
|---|---|---|---|
| 3,637,592 | A | 1/1972 | Berr |
| 4,176,222 | A | 11/1979 | Cinderey et al. |
| 4,320,224 | A | 3/1982 | Rose et al. |
| 4,816,556 | A | 3/1989 | Gay et al. |
| 5,250,738 | A | 10/1993 | Hackenbruch et al. |
| 5,300,693 | A | 4/1994 | Gilb et al. |
| 9,175,136 | B2 | 11/2015 | Louis |
| 2015/0183918 | A1 | 7/2015 | Le et al. |

FOREIGN PATENT DOCUMENTS

| | | |
|---|---|---|
| CN | 1974631 A | 6/2007 |
| EP | 323076 A2 | 7/1989 |
| WO | 9001509 A1 | 2/1990 |
| WO | 2009021918 A1 | 2/2009 |
| WO | 201104164 A2 | 1/2011 |
| WO | 2014013202 A1 | 1/2014 |
| WO | 2016092087 A1 | 6/2016 |
| WO | 2017153290 A1 | 9/2017 |
| WO | 2018115033 A1 | 6/2018 |

OTHER PUBLICATIONS

Fukawa et al., Preparation of Dibenzofuran-Type Amorphous Polyetherketone by Novel Etherification Reaction, 1992, Journal of Polymer Science Part A: Polymer Chemistry, vol. 30, pp. 1977-1985 (Year: 1992).*
Standard ASTM D3850-19, "Standard Test Method for Rapid Thermal Degradation of Solid Electrical Insulating Materials By Thermogravimetric Method (TGA)", 2019, p. 1-5 (5 pages).
"Kepstan Technical Data—6000 Series", Arkema, Mar. 1, 2013, Mar. 2013 (2 pages).
"Kepstan Technical Data—7000 Series", Arkema, Mar. 1, 2013, Nov. 2012 (2 pages).
Yandek, G. R. et al. "Reduced Cost Fabrication of Large Composite Aerospace Structures Through Nanoparticle Modification of Thermoplastics (Preprint)", Engineering Research and Consulting Inc (ERC Inc) Edwards AFB CA, 2007, p. 1-14 (16 pages).
Fink, B. K. et al. "Thermal degradation effects on consolidation and bonding in the thermoplastic fiber-placement process", Army Research Loboratory, 2000, p. 1-68 (68 pages).
Herblot, Martin M. "Synthèse et caractérisation de monomères téléchéliques précurseurs de polymères thermostables de type PEKK", Thesis, 2014, p. 1-3 (3 pages).
"Détermination de MV(e) par l'opposant—représentation graphique sur Excel®", Arkema—Microsoft Edition Standard, May 16, 2022 (2 pages).
Song, C. et al. "Study on Synthesis of Poly(aryl ether ketone ketone) by Low-Temperature Solution Polycondensation*", Acta Polymerica Sinica, 1995, vol. 1, pp. 99-102 (4 pages).
Gao, H. et al. "Synthesis and Properties of Poly (Aryl Ether Ketone) S Containing Multi-Carbonyl in the Main Chain", Acta Polymerica Sinica, 2009, vol. 3, p. 284-287 (4 pages).
Murphy J., in "Additives for Plastics Handbook", 2nd Edition, 2001. Chapter 5.2.3, p. 43-48—Elsevier Advanced Technology.

(Continued)

Primary Examiner — Dah-Wei D. Yuan
Assistant Examiner — Andrew J Bowman
(74) Attorney, Agent, or Firm — Osha Bergman Watanabe & Burton LLP

(57) ABSTRACT

Described herein are poly(ether ketone ketone) ("PEKK") polymers having improved processability. It was surprisingly discovered that by selectively controlling the relative amounts of reactants during the synthesis, PEKK polymers having unexpectedly lower melt viscosities can be obtained. More particularly, by selectively controlling the relative amounts of monomers used to form recurring units of the PEKK polymer, in conjunction with selective control of other reaction components, the resulting PEKK polymers had reduced viscosities, relative to PEKK polymers synthesized by using tradition reaction schemes ("traditional PEKK polymers"). By providing PEKK polymers with lower melt viscosities, the PEKK polymers described herein have improved processability.

15 Claims, No Drawings

(56) References Cited

OTHER PUBLICATIONS

Standard ASTM D3835, "Standard Test Method for Determination of Properties of Polymeric Materials by Means of a Capillary Rheometer", 2008, p. 1-11.
Emel Y. et al., "Thermal and Mechanical Properties of Poly(arylene ether ketone)s having Pendant Tertiary Butyl Groups", Journal of Polymer Research, Kluwer Academic Publishers—Consultants Bureau, NL, vol. 14, No. 1, Nov. 3, 2006 (Nov. 3, 2006), pp. 61-66, XP019466913, ISSN: 1572-8935.
Standard ASTM D2857-95R01, "Standard Practice for Dilute Solution Viscosity of Polymers", 1995, reapproved 2001, p. 1-6.
Standard ASTM D3850-12, "Standard Test Method for Rapid Thermal Degradation of Solid Electrical Insulating Materials by Thermogravimetric Method (TGA)", 2012, p. 1-4.

\* cited by examiner

POLY (ETHER KETONE KETONE) POLYMERS, CORRESPONDING SYNTHESIS METHODS AND POLYMER COMPOSITIONS AND ARTICLES MADE THEREFROM

CROSS-REFERENCE TO RELATED APPLICATIONS

This application is a divisional of U.S. application Ser. No. 16/471,536 filed on Jun. 19, 2019 (allowed), which claims priority to U.S. Provisional Application No. 62/437,300 filed Dec. 21, 2016, U.S. Provisional Application No. 62/456,941 filed Feb. 9, 2017, and European Application No. EP 17169170.2 filed May 3, 2017, the whole content of these applications being incorporated herein by reference for all purposes.

FIELD OF THE INVENTION

The invention relates to poly(ether ketone ketone) polymers. The invention further relates to the synthesis of poly(ether ketone ketone) polymers. The invention still further relates to polymer compositions including the poly (ether ketone ketone) polymers and articles made therefrom.

BACKGROUND OF THE INVENTION

Poly(ether ketone ketone) ("PEKK") polymers are well suited for use in relatively extreme conditions. In part, due to the high crystallinity and high melt temperature of PEKK polymers, they have excellent thermal, physical and mechanical properties. Such properties make PEKK polymers desirable in a wide range of demanding application settings including, but not limited to, aerospace and oil and gas drilling. Nevertheless, the same high crystallinity and high melt temperatures that provide many of the benefits of PEKK polymers also present difficulties in processing. Accordingly, there is an ongoing need to develop PEKK polymers having improved processability.

DETAILED DESCRIPTION OF THE INVENTION

Described herein are poly(ether ketone ketone) ("PEKK") polymers having improved processability. It was surprisingly discovered that by selectively controlling the relative amounts of reactants during the synthesis, PEKK polymers having unexpectedly lower melt viscosities can be obtained. More particularly, by selectively controlling the relative amounts of monomers used to form recurring units of the PEKK polymer, in conjunction with selective control of other reaction components, the resulting PEKK polymers had reduced viscosities, relative to PEKK polymers synthesized by using tradition reaction schemes ("traditional PEKK polymers"). By providing PEKK polymers with lower melt viscosities, the PEKK polymers described herein have improved processability.

Furthermore, compared with PEKK polymers synthesized using an electrophilic synthesis route, the PEKK polymers described herein has significantly lower chlorine concentrations as well as significantly improved thermal stability. Due to the halogenated acid used to generate the intermediate carbocation during electrophilic substitution, PEKK polymers synthesized using an electrophilic synthesis scheme have a significantly elevated residual chlorine concentration, relative to PEKK polymers synthesized via nucleophilic routes. Correspondingly, PEKK polymers synthesized by electrophilic routes must undergo a significant amount of purification to reduce chlorine concentration, for example, for use in consumer electronic device application settings which generally require a chlorine concentration of less than 900 parts per million by weight ("ppm"). In commercially relevant processes (e.g. large scale polymer manufacturing), the costs associated with removal of chlorine can be significant, due to the economies of scale. Accordingly, the PEKK polymers described herein using a nucleophilic synthesis route can provide significant reduction in large scale production costs. Additionally, because PEKK polymers synthesized using an electrophilic route have lower thermal stability, there is a significantly higher rate of defects in parts made from such PEKK polymers, relative to PEKK polymers synthesized using a nucleophilic route as described here.

The Poly(Ether Ether Ketone) Polymers

The PEKK polymers of interest herein contain at least one recurring unit ($R^M_{PEKK}$) and at least one recurring unit ($R^P_{PEKK}$). Each recurring unit ($R^M_{PEKK}$) is represented by a formula according to the general formula:

$$-[-M_m-O-]-, \text{ and} \quad (1)$$

each recurring unit ($R^P_{PEKK}$) is represented by a formula according to the following general formula:

$$-[-M_p-O-]-, \quad (2)$$

where $M_m$ and $M_p$ are represented by the following general formulae, respectively:

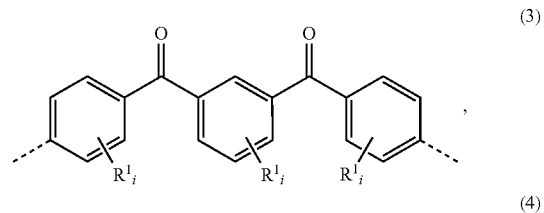

(3)

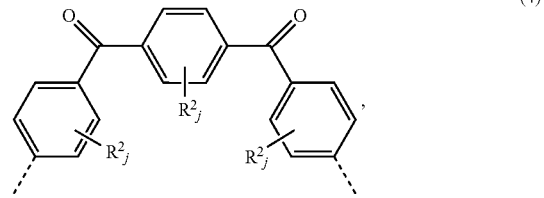

(4)

In Formulae (3) and (4), $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4. As used herein, a dashed bond indicates a bond to an atom outside of the drawn structure. The subscripts "p" and "m" on the species "M" reflect the respective para (Formulae (4)) and meta (Formula (3)) benzoyl substitutions on the central benzene ring. In some embodiments, each i and j are zero. For clarity, in some embodiments, the PEKK polymer has a plurality of recurring units ($R^M_{PEKK}$), a plurality of recurring unit ($R^P_{PEKK}$), or both, with each recurring unit being distinct. Accordingly, reference to recurring units ($R^M_{PEKK}$) references all types of recurring units in PEKK according to general Formula (1) and reference to recurring units ($R^P_{PEKK}$) references all types of recurring units in PEKK according to general Formula (2).

As used herein, a PEKK polymer refers to any polymer in which the total concentration of recurring units ($R^M_{PEKK}$) and recurring units ($R^P_{PEKK}$) is at least 50 mol %, relative to the total number of moles of recurring unit in the PEKK polymer. In some embodiments, the total concentration of recurring units ($R^M_{PEKK}$) and recurring units ($R^P_{PEKK}$) is at least 60 mol %, at least 70 mol %, at least 80 mol %, at least 90 mol %, at least 95 mol % or at least 99 mol %, relative to the total number of moles of recurring units in the PEKK polymer. In some embodiments, the ratio of the total number of moles of recurring units ($R^P_{PEKK}$) to the total number of moles of recurring units ($R^M_{PEKK}$) ("($R^P_{PEKK}$)/($R^M_{PEKK}$) ratio") is at least about 1:1, at least about 1.2:1, at least about 1.3:1, at least about 1.4:1. Additionally or alternatively, the ($R^P_{PEKK}$)/($R^M_{PEKK}$) ratio is no more than about 5.7:1, no more than about 5:1, no more than about 4:1, no more than about 3.5:1 or no more than about 3:1, or no more than about 2.7:1.

In some embodiments, recurring units ($R^M_{PEKK}$) include a recurring unit ($R^M_{PEKK}$) and recurring ($R^P_{PEKK}$) includes recurring units ($R^{P1}_{PEKK}$), ($R^{P2}_{PEKK}$), and ($R^{P3}_{PEKK}$). Recurring units ($R^{M1}_{PEKK}$), ($R^{P1}_{PEKK}$), ($R^{P2}_{PEKK}$) and ($R^{P3}_{PEKK}$) are represented by the following formulae, respectively:

$$-[-M^{1*}_m-O-]-, \quad (5)$$

$$[-M^{1*}_p-O-]-, \quad (6)$$

$$[-M^{2*}_p-O-]-, \quad (7)$$

$$-[-M^{3*}_p-O-]-, \text{ and} \quad (8)$$

where $M^{1*}_m$, $M^{1*}_p$, $M^{2*}_p$, and $M^{3*}_p$ are represented by the following formulae, respectively:

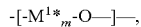

(9)

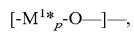

(10)

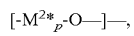

(11)

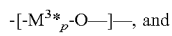

, and (12)

where $R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $i^*$, $j^*$, $k^*$ and $L^*$, at each instance, is an independently selected integer ranging from 0 to 4. In some embodiments, each $i^*$, $j^*$, $k^*$ and $L^*$ is zero. In some embodiments, the total concentration of recurring unit ($R^M_{PEKK}$) and recurring units ($R^{P1}_{PEKK}$), ($R^{P2}_{PEKK}$) and ($R^{P3}_{PEKK}$), is at least 50 mol %, at least 60 mol %, at least 70 mol %, at least 80 mol %, at least 90 mol %, at least 95 mol % or at least 99 mol %, or 100 mol %, relative to the total number of moles of recurring units ($R^M_{PEKK}$) and recurring units ($R^P_{PEKK}$). In some embodiments, ratio of the total number of moles of recurring units ($R^{P1}_{PEEK}$), ($R^{P2}_{PEKK}$), and ($R^{P3}_{PEKK}$) to the number of moles of recurring unit ($R^M_{PEKK}$) is within the ranges above described with respect to recurring units ($R^M_{PEKK}$) and ($R^P_{PEKK}$).

As noted above, the PEKK polymers have unexpectedly lower melt viscosity ("MV") for a given $\eta_{inh}$, e.g., they exhibit a lower melt viscosity for a the same mechanical properties. The PEKK polymers described herein can have a ΔMV that is no more than −2 Pa·s, where $$\Delta MV = MV^{(e)} - MV \text{ and} \quad (E1)$$

$$MV^{(e)} = m_{mv}\eta_{inh}^n, \quad (E2)$$

and where $MV^{(e)}$ is the expected melt viscosity (in Pascal·seconds ("Pa·s")) and $\eta_{inh}$ is the inherent viscosity (in deciliters per gram ("dL/g")) of the PEKK polymer. The parameters $m_{mv}$ and n in equation E2 can be determined empirically by plotting MV vs. $\eta_{inh}$ for various traditional PEKK polymers and fitting to the curve $MV = m_{mv}\eta_{inh}^n$. For the PEKK polymers of interest herein where the ($R^P_{PEKK}$)/($R^M_{PEKK}$) ratio is from 55:45 (1.2:1) to 65:35 (1.86:1), MV is measured at 410° C. as decribed in the examples below and $m_{mv}=1006$ (Pa·s)(g/dL)$^{3.9}$ and n=3.90, as demonstrated in the Examples below. For the PEKK polymers of interest herein where the ($R^P_{PEKK}$)/($R^M_{PEKK}$) ratio is greater than 65:35 (1.86:1) to 75:25 (3.00:1), MV is measured at 380° C. as described in the examples below and $m_{mv}=1490$ (Pa·s)(g/dL)$^{3.98}$ andn=3.98, also as demonstrated in the Examples below. MV and $\eta_{inh}$ are measured as described in the Examples below. In some embodiments, the PEKK polymers can have ΔMV that is no more than about −3 Pa·s, no more than about −5, no more than about −10, no more than about 12, no more than about −30, no more than −40, no more than −50, or no more than −60.

The PEKK polymer can have a $T_m$ from 280° C. to 370° C., from 285° C. to 360° C., or from 290° C. to 350° C. The $T_m$ is measured by DSC as described in the examples. The PEKK polymers can have a $\eta_{inh}$ of at least 0.40 dL/g, at least 0.50 dL/g, or at least 0.60 dL/g. Additonally or alternatively, the PEKK polymers can have a $\eta_{inh}$ of no more than 1.50 dL/g, no more than 1.40 dL/g, or no more than 1.2 dL/g. $\eta_{inh}$ is measured as described in the Examples below.

Additionally, as mentioned above, the PEKK polymers described herein have a significantly reduced residual chlorine concentration and increased thermal stability, relative to PEKK polymers synthesized using electrophilic synthesis routes. Accordingly, polymer compositions including the PEKK polymers can also have a significantly reduced residual chlorine concentration. In some embodiments, a polymer composition including the PEKK polymer can have a residual chlorine concentration of less than about 900 parts per million by weight ("ppm"), less than about 500 ppm, less than about 400 ppm, less than about 300 ppm, less than about 250 ppm, less than about 100 ppm, or less than about 70 ppm. The residual chlorine concentration is measured as described in the Examples below. With respect to increased thermal stability, the PEKK polymers of interest herein have a 1 wt. % thermal decomposition temperature ("Td(1%)") of at least 490° C., at least 495° C., or at least 500° C. Td(1%) is measured as described in the Examples below.

Synthesis of Poly(Ether Ketone Ketone) Polymers

As mentioned above, it was found that the polymer synthesis methods described herein produces PEKK polymers having unexpectedly reduced melt viscosities. The synthesis approach involves selective control of the reactants, as well as other components of the synthesis scheme. More specifically, the synthesis approach involves reacting a blend of bis(hydroxybenzoyl) benzene monomers and bis(halobenzoyl) benzene monomers in the presence of sodium carbonate, $Na_2CO_3$, and a solvent, where the relative amounts of the aforementioned components are selected to achieve PEKK polymers having unexpectedly reduced melt viscosities.

In general, the PEKK polymers of interest herein include recurring units formed from the polycondensation of 1,3-bis(benzoyl) monomers and 1,4-bis(benzoyl) monomers having the following general formulae, respectively, $$X^5-M_m-X^5, \text{ and} \tag{13}$$

$$X^6-M_p-X^6. \tag{14}$$

where $X^5$ is an —OH or halogen and $X^6$ is an —OH or halogen. As used herein, a halogen refers to any one of F, Cl, Br, and I. Preferably the halogen is F or Cl, more preferably the halogen is F. As used herein, a 1,3-bis(benzoyl) benzene monomer refers to a monomer represented by Formula (13) and 1,4-bis(benzoyl) benzene monomer refers to a monomer represented by Formula (14). Additionally, a bis(hydroxybenzoyl) benzene monomer refers to a monomer represented by Formula (13) or (14) where $X^5$ or $X^6$, respectively, is an —OH. A bis(halobenzoyl) benzene monomer refers to a monomer represented by Formula (13) or (14) where $X^5$ or $X^6$, respectively, is a halogen. For example, a 1,3-bis(hydroxybenzoyl) benzene monomer refers to a monomer of Formula (13) where $X^5$ is —OH. As another example, a 1,4-bis(halobenzoyl) benzene monomer refers to a monomer of Formula (14) where $X^6$ is a halogen.

The PEKK polymers synthesis involves reacting, in a reaction mixture, a blend of bis(hydroxybenzoyl) benzene monomers and bis(halobenzoyl) benzene monomers in the presence of $Na_2CO_3$ and a solvent, where the relative amounts of the aforementioned components are selected according the following Formulae:

$$\Sigma=(\% \ Na_2CO_3-105)+6|\% \ K_2CO_3-1|+0.25\beta7-\% \text{ Monomers}|-\% \ XS_{DFDK}<6, \tag{EQ1}$$

$$0\leq\% \ K_2CO_3<5, \text{ and} \tag{EQ2}$$

$$0\leq\% \ XS_{DFDK}, \tag{EQ3}$$

$$25\leq\% \ \text{Monomers}\leq44, \tag{EQ4}$$

where (a) % $Na_2CO_3$ is the concentration, in mol %, of $Na_2CO_3$, relative to the number of moles of bis(hydroxybenzoyl) benzene monomers; (b) % $K_2CO_3$ is the concentration, in mol %, of potassium carbonate, $K_2CO_3$, relative to the number of moles of bis(hydroxybenzoyl) benzene monomers; (c) % Monomers is the total concentration, in wt. %, of bis(hydroxybenzoyl) benzene monomers and bis(halobenzoyl) benzene monomers relative to the total weight of the bis(hydroxybenzoyl) benzene monomers, bis(halobenzoyl) benzene monomers and solvent; and (d) % $XS_{DFDK}$ is the concentration, in mol %, of bis(halobenzoyl) benzene monomers in excess of an equimolar concentration, relative to the concentration of bis(hydroxybenzoyl) benzene monomers. For ease of reference, $Na_2CO_3$, $K_2CO_3$, bis(hydroxybenzoyl) benzene monomers, bis(halobenzoyl) benzene monomers and solvent are collective referred to as "reaction components." In general, for the PEKK polymers of interest herein, $\Sigma<6.0$, preferably $\Sigma<5.5$, more preferably $\Sigma<5.0$. For PEKK polymers having a $(R^P_{PEKK})/(R^M_{PEKK})$ ratio of more than 65/35 (1.86:1) to 75/25 (3.00:1), $\Sigma<6.0$, preferably $\Sigma<5.5$, more preferably $\Sigma<5.0$. For PEKK polymers having a $(R^P_{PEKK})/(R^M_{PEKK})$ ratio of 55/45(1.22:1) to 65/35 (1.87:1), $\Sigma<2.0$, preferably $\Sigma<1.5$, more preferably $\Sigma<1.0$.

With respect to % $Na_2CO_3$ and % $K_2CO_3$, in some embodiments, % $Na_2CO_3$+% $K_2CO_3<106.0\%$. % $Na_2CO_3$+$K_2CO_3$ is preferably at least 95%, more preferably at least 100%, more preferably at least 102%. Preferably, the $Na_2CO_3$ meets the particle size distribution requirements as detailed in U.S. Pat. No. 9,175,136, to Louis, filed Oct. 23, 2009 and incorporated herein by reference.

With respect to % $XS_{DFDK}$, it reflects the quantity of bis(halobenzoyl) benzene monomers in excess of an equimolar quantity of bis(hydroxybenzoyl) benzene monomers. As noted above, each recurring unit ($R^M_{PEKK}$) and ($R^P_{PEKK}$) is formed from the polycondensation of a bis(hydroxybenzoyl) benzene monomer and a bis(halohydroxy) benzene monomer, such that the number of moles of bis(hydroxybenzoyl) benzene monomers and bis(halohydroxy) benzene monomers is equimolar. Accordingly, in embodiments in which % $XS_{DFDK}>0$, the monomer blend includes more moles of bis(halobenzoyl) benzene monomers, relative to the number of moles of bis(hydroxybenzoyl) benzene monomers. In some such embodiments, % $XS_{DFDK}$ is from 0.1 mol % to 10.0 mol %, preferably from 0.3 mol % to 5.0 mol %, more preferably from 0.5 to 3.0 mol %.

With respect to the solvent, it can include, but is not limited to, diphenyl sulfone, dibenzothiophene dioxide, benzophenone or combinations of any one or more thereof. Preferably, the solvent includes diphenyl sulfone. More preferably, the solvent includes at least 90 wt. %, at least 95 wt. %, at least 98 wt. % or at least 99 wt. % diphenyl sulfone. In some embodiments, the diphenyl sulfone is used in the synthesis method described herein includes limited amounts of impurities, as detailed in U.S. Pat. No. 9,133,111, to Louis et al., filed Apr. 7, 2014 and incorporated herein by reference.

With respect to the relative concentration of bis(hydroxybenzoyl) benzene monomers and bis(halobenzoyl) benzene monomers, it is noted that each recurring unit of ($R^M_{PEKK}$)

and recurring units ($R^P_{PEKK}$) is formed from the polycondensation of a bis(hydroxybenzoyl) benzene monomer (a 1,3-bis(hydroxybenzoyl) benzene monomer or 1,4-bis(hydroxybenzoyl) benzene monomer) and a bis(halobenzoyl) benzene monomer (a 1,3-bis(halobenzoyl) benzene monomer or 1,4-bis(halobenzoyl) benzene monomer). Accordingly, the ratio of the total amount of bis(hydroxybenzoyl) benzene monomers to the total amount of bis(halobenzoyl) benzene monomers used in the synthesis reaction to form the recurring units ($R^M_{PEKK}$) and ($R^P_{PEKK}$) is substantially equimolar. As used herein, substantially equimolar means within 10% of equimolar, preferably 5% of equimolar, most preferably within 3% of equimolar. For example, the ratio of the number of moles of bis(hydroxybenzoyl) benzene monomer to the number of moles of the bis(halobenzoyl) benzene monomer is from about 0.9:1 to about 1:0.9, more preferably 0.95:1 to 1:0.95, most preferably from about 0.97:1 to about 1:0.97, and most preferably between 0.97:1 and 1.00:1.

More specifically, each recurring unit ($R^M_{PEKK}$) is formed from the polycondensation of two, distinct 1,3-bis(benzoyl) benzene monomers; or from the polycondensation of a 1,3-bis(benzoyl) benzene monomer and a 1,4-bis(benzoyl) benzene monomer. Analogously, each recurring unit ($R^P_{PEKK}$) is formed from the polycondensation of two, distinct 1,4-bis(benzoyl) benzene monomers; or from the polycondensation of a 1,3-bis(benzoyl) benzene monomer and a 1,4-bis(benzoyl) benzene monomer. For example, the polycondensation of a monomer according to the formula $X^5$-$M_m$-$X^5$ (1,3-bis(benzoyl) benzene) with a monomer according to the formula $X^6$-$M_p$-$X^6$ (1,4-bis(benzoyl) benzene), forms recurring units ($R^P_{PEKK}$) and ($R^M_{PEKK}$), where $X^5$ is an —OH or halogen and $X^6$ is a halogen if $X^5$ is an —OH and $X^6$ is an —OH if $X^5$ is a halogen. As another example, the polycondensation of a monomer according to the formula $X^5$-$M_m$-$X^5$ (1,3-bis(benzoyl) benzene) with a monomer according to the formula $X^7$-$M^*_m$-$X^7$ (1,3-bis(benzoyl) benzene) forms recurring units ($R^M_{PEKK}$), where $M^*_m$ is represented by a Formula (13), the same or distinct from $M_m$, and where $X^5$ is an —OH or halogen and $X^7$ is a halogen if $X^5$ is an —OH and $X^7$ is an —OH if $X^5$ is a halogen. As yet another example, the polycondensation of a monomer according to the formula $X^6$-$M_p$-$X^6$ (1,4-bis(benzoyl) benzene) with a monomer according to the formula $X^8$-$M^*_p$-$X^8$(1,4-bis(benzoyl) benzene), forms recurring units ($R^P_{PEKK}$), where $M^*_p$ is represented by a Formula (14), the same or distinct from $M_p$, and where $X^6$ is an —OH or halogen and $X^8$ is a halogen if $X^6$ is an —OH and $X^8$ is an OH if $X^6$ is a halogen.

As noted above, the PEKK polymers of interest herein have a ($R^P_{PEKK}$)/($R^M_{PEKK}$) ratio of from 55/45 to 75/25. Accordingly, the ratio of the number of moles of 1,4-bis(benzoyl) benzene monomers to the number of moles of 1,3-bis(benzoyl) benzene monomers ("1,4/1,3 ratio") in the blend of bis(hydroxybenzoyl) benzene monomers and bis(halobenzoyl) benzene monomer is from 55/45 to 75/25. As long as the aforementioned 1,4/1,3 ratio is satisfied, the relative amount of bis(hydroxybenzoyl) benzene monomers and bis(halobenzoyl) benzene monomers that are 1,4-bis(benzoyl) benzene and 1,3-bis(benzoyl) benzene monomers is not particularly limited. In some embodiments, at least 90 mol %, at least 95 mol % or at least 99 mol % of the 1,3-bis(benzoyl) benzene monomers are either 1,3-bis(hydroxybenzoyl) benzene monomers or 1,3-bis(halobenzoyl) benzene monomers, relative to the number of moles of recurring units ($R^M_{PEKK}$) in the PEKK polymer.

Significantly, the prescribed concentrations of the reaction components, as well as other concentrations of the reaction components described herein, are relative to the quantities of the reaction components used to form recurring units ($R^M_{PEKK}$) and ($R^P_{PEKK}$). Put another way, one or more of the reaction components can be independently incorporated into the reaction mixture at distinct points during the reacting. In some embodiments, the reaction mixture contains each of the reaction components in the quantities prescribed by Formulae (EQ1)-(EQ4) ("prescribed quantity") and the prescribed quantities of bis(hydroxybenzoyl) benzene monomers and bis(halobenzoyl) benzene monomers are reacted simultaneously. For example, in one such embodiment, the reaction mixture contains, simultaneously, $Na_2CO_3$, $K_2CO_3$, bis(hydroxybenzoyl) benzene monomers, bis(halobenzoyl) benzene monomers and solvent in their prescribed quantities prior to the reacting and the corresponding monomers are reacted therein. In alternate embodiments, one or more of the reaction components can be added to the reaction mixture at different points prior to or during the reacting. In some such embodiments, a portion of the prescribed quantity of one or more of the reaction components is added to the reaction mixture prior to the reacting and the remainder of the prescribed quantity of the one or more components is added to the reaction mixture during the reacting. In a preferred embodiment, at least 90 mol %, at least 95, or at least 99 mol % of the 1,3-bis(benzoyl) benzene monomers forming recurring units ($R^M_{PEK}$) are added to the reaction mixture either prior to the reacting or during the reaction and at least 90 mol %, at least 95, or at least 99 mol % of the 1,4-bis(benzoyl) benzene monomers forming the remaining recurring units ($R^P_{PEKK}$) are added to the reaction mixture during the reacting or prior to the reacting, respectively. In another preferred embodiment, the prescribed quantity of solvent is present in the reaction mixture prior to the reacting. In some embodiments, the prescribed quantity of $Na_2CO_3$ and $K_2CO_3$ can be added to the reaction mixture either prior to the reacting or during the first reaction. Based upon the description herein, a person of ordinary skill in the art will recognize additional methods of the adding the individual reaction components to the reaction mixture.

The reacting can include a first heating in which the reaction mixture is heated to maintain its temperature within a first temperature range of from 180° C. to 270° C. In some embodiments, the first heating can include maintaining the temperature of the reaction mixture within the first temperature range for a first period of time. The first period of time can be from 5 minutes ("min.") to 300 min., from 7 min. to 240 min. or from 10 min. to 180 min or from 15 min to 120 min. As noted above, one or more of the reaction components can be independently added to the reaction mixture at distinct points during the reacting. In some embodiments, each of reaction components, in their prescribed quantities, is added to the reaction mixture prior to the first heating. In alternate embodiments, at least one or more of the reaction components is added to the reaction mixture during the first heating and the remainder of the reaction components are added to the reaction mixture prior to the first heating. In some such embodiments, the prescribed quantity of the one or more reaction components is added to the reaction mixture during the first heating (e.g. the full amount of the one or more reaction components). In alternative such embodiments, only a portion of the prescribed quantity of the one or more reaction components is added to the reaction mixture during the first heating and the remaining portion is added to the reaction mixture prior to the first heating. In general, each reaction component is present in the reaction mixture in its prescribed quantity prior to the end of the first heating. In such embodiments, the first time period is relative to the point in time at which the prescribed quantity of each reaction component has been added to the reaction mixture. In a preferred embodiment, at least 90 mol %, at least 95, or at least 99 mol % of the 1,3-bis(benzoyl) benzene monomers forming recurring units ($R^M_{PEK}$) are added either prior to the first heating or during the first heating and wherein at least 90 mol %, at least 95, or at least 99 mol % of the 1,4-bis(benzoyl) benzene monomers forming the remaining 1,4-bis(benzoyl) benzene monomers are added during the first heating or prior to the first heating, respectively.

In some embodiments, the reacting further includes a second heating, subsequent to the first heating, in which the reaction mixture is heated to maintain its temperature within a second temperature range that is from 300° C. to 340° C. In some such embodiments, the reaction mixture can be maintained with the second temperature range for a second period of time. The second period of time period can be from 0 to 240 min., from 0 to 180 min., or more 0 to 120 min. In some embodiments, the second heating further includes adding an end-capping agent to the reaction mixture. The end-capping agent controls the molecular weight of the PEKK polymer by terminating the polymerization reaction at a selected point during polymerization.

In such embodiments, the second heating includes the second addition. Desirable end-capping agents include those represented by the following formula:

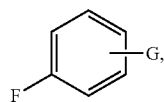
(15)

where g is —C(O)—Ar or S(O2)-Ar, and Ar is an arylene group. In some embodiments, the end-capping agent is an excess of a bis(halobenzoyl) benzene monomer (1,3-bis (halobenzoyl) benzene monomer or 1,4-bis(halobenzoyl) benzene monomer) used to form recurring units ($R^M_{PEKK}$) or recurring units ($R^P_{PEKK}$) of the PEKK polymer. As used herein, and excess refers to amount of the 1,3-bis(halobenzoyl) benzene monomer or 1,4-bis(halobenzoyl) benzene monomer above the amount that would bring the total amount of the respective monomer added to the reaction mixture to at least 1.04 times an equimolar amount to the bis(hydroxybenzoyl) benzene monomer, preferably at least 1.05, more preferably at least 1.07. For clarity, in embodiments, in which the end-capping agent is a bis(halobenzoyl) benzene monomer used to form used to form recurring units ($R^M_{PEKK}$) or recurring units ($R^P_{PEKK}$), the amount of end-capping agent is not included in the % $XS_{DFDK}$.

In some embodiments of the method for forming a PEKK polymer, bis(hydroxybenzoyl) benzene monomers and bis (halobenzoyl) benzene monomers collectively include at least one first 1,3-bis(benzoyl) benzene monomer, at least one first 1,4-bis(benzoyl) benzene monomer, at least one second 1,4-bis(benzoyl) benzene monomer, and at least one third 1,4-bis(benzoyl) benzene monomer, where each 1,3-bis(benzoyl) benzene monomer is represented by a formula according to Formula (13) and each 1,4-bis(benzoyl) benzene monomer is represented by a formula according to Formula (14). In some such embodiments, one of the at least one first 1,3-bis(benzoyl) benzene monomer, one of the at least one first 1,4-bis(benzoyl) benzene monomer, one of the at least one second 1,4-bis(benzoyl) benzene monomer, and one of the the at least one third 1,4-bis(benzoyl) benzene monomer are represented by the following formulae, respectively:

$$X^1\text{-}M^1{}^*_m\text{-}X^1, \tag{16}$$

$$X^2\text{-}M^1{}^*_p\text{-}X^2, \tag{17}$$

$$X^3\text{-}M^2{}^*_p\text{-}X^3, \tag{18}$$

$$X^4\text{-}M^3{}^*_p\text{-}X^4, \text{ and} \tag{19}$$

wherein $X^1$ is —OH or a halogen; $X^2$ is a halogen if $X^1$ is an —OH and $X^2$ is an —OH if $X^1$ is a halogen; $X^3$ is an —OH or a halogen; and $X^4$ is an halogen if $X^3$ is an —OH and $X^4$ is an —OH if $X^3$ is a halogen. In some such embodiments, monomers $X^1\text{-}M^{*1}_m\text{-}X^1$ and $X^2\text{-}M^{*1}_p\text{-}X^2$ polycondense to form recurring units ($R^{M1}_{PEKK}$) and ($R^{P1}_{PEKK}$), respectively, and monomers $X^3M^*_p\text{-}X^3$ and $X^4\text{-}M^*_p\text{-}X^4$ polycondense to form recurring units ($R^{P2}_{PEKK}$), and ($R^{P3}_{PEKK}$), respectively. In some such embodiments $X^1$ and $X^3$ are —OH. In some embodiments, each i*, j*, k* and L* are zero, such that recurring units ($R^{P1}_{PEKK}$), ($R^{P2}_{PEKK}$) and ($R^{P3}_{PEKK}$) are identical.

Polymer Compositions, Shaped Articles, and Applications

The PEKK polymers described herein can be desirably used in polymer compositions and incorporated into shaped articles, including but not limited to mobile electronic devices, medical devices, and composite materials. Furthermore, the PEKK polymers, or compositions thereof, can also be desirably used in additive manufacturing application settings.

Polymer compositions including the PEKK polymers ("PEKK polymer compositions") can include a reinforcing filler. Reinforcing fillers include fibrous fillers and particulate fillers, distinct from the pigments described below. Particulate filers include mineral fillers including, but not limited to, talc, mica, kaolin, calcium carbonate, calcium silicate, and magnesium carbonate. Fibrous fillers include, but are not limited to, glass fiber, carbon fiber, synthetic polymeric fiber, aramid fiber, aluminum fiber, titanium fiber, magnesium fiber, boron carbide fiber, rock wool fiber, steel fiber, wollastonite. Preferably the reinforcing fillers is selected from mica, kaolin, calcium silicate, magnesium carbonate, glass fiber, carbon fiber, wollastonite, and any combination of one or more thereof.

Preferably, the filler is a fibrous filler. A particular class of fibrous fillers consists of whiskers, i.e. single crystal fibers made from various raw materials, such as $Al_2O_3$, SiC, BC, Fe and Ni. In one embodiment, the reinforcing filler is selected from wollastonite and glass fiber. Among fibrous fillers, glass fibers are preferred; they include chopped strand A-, E-, C, D-, S-, T- and R-glass fibers, as described in chapter 5.2.3, p. 43-48 of Additives for Plastics Handbook, 2nd edition, John Murphy.

When the glass fibers has a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the reinforcing filler includes carbon fiber. As used herein, the term "carbon fiber" is intended to include graphitized, partially graphitized and ungraphitized carbon reinforcing fibers or a mixture thereof. Carbon fibers can advantageously be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers are preferably selected from PAN-based carbon fibers, pitch based carbon fibers, graphite fibers, and any combination of one or more thereof.

The weight of the reinforcing filler is preferably below 80% wt., more preferably below 70% wt., even more preferably below 65% wt., based on the total weight of the composition.

In some embodiments, the PEKK polymer compositions can include, in addition or alternatively to the reinforcing filler one or more additional ingredients selected from the group consisting of (i) colorants (e.g. a dye); (ii) pigments (e.g., titanium dioxide, zinc sulfide and zinc oxide); (iii) light stabilizers (e.g. UV stabilizers); (iv) heat stabilizers; (v) antioxidants (e.g. organic phosphites and phosphonites); (vi) acid scavengers (vii) processing aids (viii) nucleating agents (ix) plasticizer, internal lubricants, and external lubricants; (x) flame retardants (xi) smoke-suppressing agents (x) antistatic agents (xi) anti-blocking agents (xii) conductivity additives (e.g. carbon black and carbon nanofibrils) (xiii) plasticizers; (xiv) flow modifiers; (xv) extenders; (xvi) metal deactivators and any combination of one or more thereof. In some embodiments, the total concentration of additional ingredients is below 20%, preferably below 10%, more preferably below 5% and even more preferably below 2%, based upon the total weight of the polymer composition.

In some embodiments, the composition comprises the PEKK polymer in combination with one or more than one additional polymeric components, such as polyarylether polymers different from PEKK polymer, including, but not limited to, poly(ether ether ketone) ("PEEK") polymers, poly(ether ketone) ("PEK") polymers, sulfone polymers, and polyaryl sulphide polymers. According to other embodiments, the PEKK polymer, as above detailed, is the only polymeric component in PEKK polymer composition. The expression 'polymeric components' is to be understood according to its usual meaning, i.e. encompassing compounds characterized by repeated linked units, having typically a molecular weight of 2,000 g/mol or more.

As noted above, the PEKK polymers synthesized as described herein have significantly reduced residual chlorine concentration, relative to corresponding PEKK polymer synthesized using an electrophilic route. The polymer compositions including the PEKK polymers synthesized as described herein can have a residual chlorine concentration of less than 900 ppm, less than 500 ppm, less than 400 ppm, less than 300 ppm, less than 250 ppm, less than 100 ppm, or less than 70 ppm.

The PEKK polymer compositions can be prepared by a variety of methods involving intimate admixing of the PEKK polymer, optionally the reinforcing filler and optionally the above described additional ingredient desired in the PEKK polymer composition, for example by dry blending, suspension or slurry mixing, solution mixing, melt mixing or a combination of dry blending and melt mixing.

Typically, the dry blending of PEKK polymer, as detailed above, preferably in powder state, optionally the reinforcing filler and optionally additional ingredients is carried out by using high intensity mixers, such as notably Henschel-type mixers and ribbon mixers so as to obtain a physical mixture, in particular a powder mixture of the at least one PEKK polymer, optionally the reinforcing filler and optionally additional ingredients. Alternatively, the intimate admixing of the PEKK polymer, optionally the reinforcing filler and optionally additional ingredients desired in the PEKK polymer composition, is carried out by tumble blending based on a single axis or multi-axis rotating mechanism so as to obtain a physical mixture.

Alternatively, the slurry mixing of the PEKK polymer, optionally the reinforcing filler and optionally additional ingredients is carried out by first slurrying the PEKK polymer, as above detailed, in powder form, optionally the reinforcing filler and optionally additional ingredients using an agitator in an appropriate liquid such as for example methanol, followed by filtering the liquid away, so as to obtain a powder mixture of the at least one PEKK polymer, optionally the reinforcing filler and optionally additional ingredients.

In another embodiment, the solution mixing of the PEKK polymer, as detailed above, optionally the reinforcing filler and optionally additional ingredients using an agitator in an appropriate solvent or solvent blends such as for example diphenyl sulfone, benzophenone, 4-chlorophenol, 2-chlorophenol, meta-cresol. Diphenyl sulfone is most preferred.

Following the physical mixing step by one of the aforementioned techniques, the physical mixture, in particular the obtained powder mixture, of the at least one PEKK polymer, optionally the reinforcing filler and optionally additional ingredients is typically melt fabricated by known methods in the art including notably melt fabrication processes such as compression molding, injection molding, extrusion and the like, to provide shaped articles.

So obtained physical mixture, in particular the obtained powder mixture can comprise the PEKK polymer, the reinforcing filler, as detailed above, and optionally, other ingredients in the weight ratios as above detailed, or can be a concentrated mixture to be used as masterbatch and diluted in further amounts of the PEKK polymer, as above detailed, the reinforcing filler, as detailed above, and optionally, other ingredients in subsequent processing steps. For example, the obtained physical mixture can be extruded into a stock shape like a slab or rod from which a final part can be machined. Alternatively, the physical mixture can be compression molded into a finished part or into a stock shape from which a finished part can be machined.

It is also possible to manufacture the composition of the invention by further melt compounding the powder mixture as above described. As said, melt compounding can be effected on the powder mixture as above detailed, or directly on the PEKK polymer, as above detailed, the reinforcing filler, as detailed above, and optionally, other ingredients. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents, it is advantageously possible to obtain strand extrudates of the PEKK polymer composition of the invention. Strand extrudates of the PEKK polymer composition can be chopped by means e.g. of a rotating cutting knife after some cooling time on a conveyer with water spray. Thus, for example a PEKK polymer composition which may be present in the form of pellets or beads can then be further used for the manufacture of shaped articles, notably of different shape and size.

The PEKK polymer compositions (or PEKK polymer) can be desirably incorporated into shaped articles. The shaped articles can be made from the PEKK polymer composition using any suitable melt-processing melt processing technique including, but not limited to, extrusion molding, injection molding, and compression molding. In some embodiments, the shaped articles are under the form of substantially bidimensional articles. Bidimensional articles include parts in which one dimension (thickness or height) is significantly less than the other two characterizing dimensions (width and length), for example, films and sheets. In some embodiments, the shaped article can be a coating. In some embodiments, the shaped articles are three-dimensional parts. Three-dimensional parts include parts that substantially extend in the three dimensions of space in similar manner, including under the form of complex geometries parts (e.g., concave or convex sections, possibly including undercuts, inserts, and the like).

In some embodiments, the shaped article is a component of a mobile electronic device. As used herein, a "mobile electronic device" refers to an electronic device that is transported and used in various locations. A mobile electronic device can include, but is not limited to, a mobile phone, a personal digital assistant ("PDA"), a laptop computer, a tablet computer, a wearable computing device (e.g., a smart watch and smart glasses), a camera, a portable audio player, a portable radio, a global position system receiver, and portable game console.

In some embodiments, at least a portion of a component of a mobile electronic device can be exposed to the external environment of the mobile electronic device (e.g., at least a portion of the component is in contact with the environment external to the mobile electronic device). For example, at least a portion of the component can form at least a portion of the external housing of the mobile electronic device. In some such embodiments, the component can be a full or partial "frame" around the periphery of the mobile electronic device, a beam in the form of a lattice work, or a combination thereof. As another example, at least a portion of the component can form at least a portion of an input device. In some such embodiments, a button of the electronic device can include the component. In some embodiments, the component can be fully enclosed by the electronic device (e.g., the component is not visible from an observation point external to the mobile electronic device).

In some embodiments, the PEKK polymers can be desirably incorporated into composites. In such embodiments, long fibers are solution, suspension or melt-impregnated with the PEKK polymer to form the composite. The long fibers generally have a length of at least 10 microns ("μm"). The fibers can be glass fibers or carbon fibers. In some embodiments, the composite can form a tape or woven fabric.

In some embodiments, the component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

The components of the mobile electronic device can be fabricated from the PEKK polymer compositions using methods well known in the art. For example, the mobile electronic device components can be fabricated by methods including, but not limited to, injection molding, blow molding or extrusion molding. In some embodiments, PEKK polymer composition can be formed into pellets (e.g., having a substantially cylindrical body between two ends) by methods known in the art including, but not limited to, injection molding. In some such embodiments, mobile electronic device components can be fabricated from the pellets.

Additionally, due to the improved processability (e.g. lower MV) and higher thermal stability, the PEKK polymers described herein can be desirably used in 3D printing (also known as additive manufacturing) fabrication technique such as fused filament fabrication (FFF) or selective laser sintering (SLS). Additive manufacturing involves the process of joining materials to make articles from 3D model data. The article is generally formed using layer by layer deposition. Commercially available 3D printing fabrication equipments of the FFF type include, as an example, the equipment manufactured by Stratasys, Inc. and sold under the Fortus® trademark. Examples of SLS based 3D printing equipment are available from EOS corporation such as the ones sold under the trade name EOSINT®. In such embodiments, an article can be formed by 3D printing the PEKK polymer (or PEKK polymer composition).

In some embodiments, the shaped articles described herein are medical devices or components of medical devices. As used herein, a "medical device" is an article, instrument, apparatus or machine that is used in the prevention, diagnosis, or treatment of illness or disease, or for detecting, measuring, restoring, correcting, or modifying the structure or function of a human or animal body.

Material selection is critical for medical devices, particularly in instances where the material is implanted in, or comes into contact with, the body. There is a continued need for medical device materials that meet the particular requirements of the medical device in its application setting (e.g. wear resistance), and also reduce or prevent undesirable interactions with the body, such as, for example, the leaching of chemicals from the medical device into the body.

The PEKK polymers described herein may be particularly suitable for use in medical devices, for example, because of their higher purity as reflected in their reduced chlorine and metals content.

Medical devices can generally include surgical devices, non-surgical devices, prosthetic devices, implants, etc.

In some embodiments, the medical device including the PEKK polymers described herein is an implantable medical device (IMD). IMDs are medical devices designed to replace a missing biological structure, support a damaged biological structure, or enhance an existing biological structure in the body. Examples of IMDs include cranial implants such as craniomaxillofacial implants, spinal implants such as spinal cages and spinal disks, finger and toe implants, knee replacements, hip replacements such as acetabular caps, stents, heart valves, pacemakers, and hardware such as bone screws and plates. The medical devices may also include dental devices such as removable full and partial denture frames, crowns, bridges, artificial teeth, and implant bars.

EXAMPLES

The following Examples demonstrate the synthesis of PEKK, the rheological and thermal properties of the synthesized PEKK polymers.

The following materials and measurement methods were used, referenced in the individual examples below.

Poly(Ether Ether Ketone) Polymers

In the Examples, some of the PEKK polymers were commercially obtained, while other PEKK polymers were synthesized. Commercial aromatic PEKK polymers were obtained from Solvay S.A. (Brussels, Belgium) under the trade names Cypek® FC and Cypek® DS, which present different levels of crystallinity.

Synthesized PEKK polymers were synthesized from the following monomers, as explained in further detail in each example below: 1,4-bis(4'-fluorobenzoyl); 1,3-bis(4'-fluorobenzoyl)benzene; 1,4-bis(4'-hydroxybenzoyl)benzene; and 1,3-bis(4'-hydroxybenzoyl)benzene. 1,4-bis(4'-fluorobenzoyl)benzene was prepared by Friedel-Crafts acylation of fluorobenzene according to example 1 of U.S. Pat. No. 5,300,693 to Gilb et al. (filed Nov. 25, 1992 and incorporated herein by reference), purified by recrystallization in chlorobenzene to reach a GC purity of 99.9%. 1,3-bis(4'-fluorobenzoyl)benzene was procured from 3B Corp, USA and purified by recrystallization in chlorobenzene to reach a GC purity of 99.9%. 1,4-bis(4'-hydroxybenzoyl)benzene and 1,3-bis(4'-hydroxybenzoyl)benzene were produced by hydrolysis of 1,4-bis(4'-fluorobenzoyl)benzene and 1,3-bis(4'-fluorobenzoyl)benzene, respectively following the procedure described in example 1 of U.S. Pat. No. 5,250,738 to Hackenbruch et al. (filed Feb. 24, 1992 and incorporated herein by reference), and purified by recrystallization in DMF/ethanol to reach a GC purity of 99.0%. Diphenyl sulfone (polymer grade) was commercial obtained from Proviron (99.8% pure). Other components used in the PEKK syntheses were sodium carbonate, light soda ash Soda-Solvay L® and commercially obtained from Solvay S.A. (France), and potassium carbonate ($d_{90}$<45 μm), commercially obtained from Armand Products Company (USA). The sodium carbonate, light soda ash and potassium carbonate were dried before use. Lithium chloride (anhydrous powder) was also used in the PEKK syntheses and was commercially obtained from Acros Organics (Geel, Belgium).

Analytic Methods

The PEKK polymers were characterized using the following analytical methods. Inherent viscosity ("$\eta_{inh}$") was measured following ASTM D2857 at 30° C. on 0.5 wt./vol. % solutions in concentrated $H_2SO_4$ (96 wt. % minimum) using a Cannon-Fenske capillary, size 200.

The determination of residual chlorine concentration in PEKK was measured as follows. Using forceps, a clean, dry combustion boat was placed onto a microbalance, and the balance was zeroed. One to five milligrams ("mg") of polymer sample was weighed into a combustion boat and weight was recorded to 0.001 mg. The combustion boat and sample were placed in the introduction port of a Thermo-GLAS 1200 Total Organic Halogen Analyzer, and the port was capped. The sample weight was entered into the sample weight field on the instrument computer. The sample analysis cycle was then started. The sample was burned in a mixture of argon and oxygen and the combustion products were passed through concentrated sulfuric acid scrubber to remove moisture and byproduct. Hydrogen chloride and oxychlorides from the combustion process were absorbed into the cell acetic acid solution from the gas stream. Chloride entered the cell was titrated with silver ions generated coulometrically. Percent chlorine in the sample was calculated from the integrated current and the sample weight.

Td(1%) was measured by thermal gravimetric analysis ("TGA") according to the ASTM D3850. TGA was performed on a TA Instruments TGA Q500 from 30° C. to 800° C. under nitrogen (60 mL/min) at a heating rate of 10° C./minute.

The Tg (mid-point), Tm and $\Delta H_f$ of the PEKK polymers were measured as follows: Tg (mid-point) and Tm were determined on the 2nd heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded±0.01 mg. The heat cycles were: 1st heat cycle: 30.00° C. to 400.00° C. at 20.00° C./min, isothermal at 400.00° C. for 1 min; 1st cool cycle: 400.00° C. to 30.00° C. at 20.00° C./min, isothermal for 1 min; and 2nd heat cycle: 30.00° C. to 400.00° C. at 20.00° C./min, isothermal at 400.00° C. for 1 min. The melting temperature Tm was determined as the peak temperature of the melting endotherm on the 2nd heat scan. The enthalpy of fusion was determined on the 2nd heat scan. The enthalpy of fusion was determined on the 2nd heat scan and was taken as the area over a linear baseline drawn from above the Tg to a temperature above end of the endotherm.

The melt viscosity ("MV") was measured using a capillary rheometer according to ASTM D3835. Readings were taken after 10 minute dwell time at 410° C. or at 380° C. as indicated in the tables and a shear rate of 46.3 s-1 using a die with the following characteristics: diameter=1.016 mm, length=20.32 mm, cone angle=120°.

Tensile properties were measured as follows. For examples CE1 to E8: A 102 mm×102 mm×3.2 mm plaque was prepared from the polymer by compression molding under the following conditions: 1) preheat at 343° C.; 2) 343° C./15 minutes, 2000 kg-f, 3) 343° C./2 minutes, 2700 kg-f; and 4) cool down to 30° C. over 40 minutes, 2000 kg-f. For examples CE9 to E26 the same molding program was used except that the temperature for steps 1 to 3 was set at 377° C. The 102 mm×102 mm×3.2 mm compression molded plaques were machined into Type V ASTM tensile specimens and these specimens of the various polymer compositions were subjected to tensile testing according to ASTM method D638 at 0.05 inch/minute room temperature (i.e. 23° C.) on 5 specimens.

In the examples below, the T/I ratio refers to the ratio of the number of moles of recurring unit ($R^P_{PEKK}$) to the number of moles of recurring unit ($R^M_{PEKK}$).

Comparative Example 1: Analysis of PEKK Synthesized by Electrophilic Synthesis Route The following example demonstrates the analysis of PEKK synthesized using an electrophilic synthesis route. Cypek® DS was analyzed as described above, and the results are displayed in Tables 1 and 2.

Comparative Example 2a: Synthesis and Analysis of PEKK with 60/40 T/I Ratio

This example demonstrates the synthesis of a PEKK polymer via a traditional nucleophilic synthetic route, according to Chinese patent application publication number 1974631 to Zhou and filed Nov. 21, 2006 ("the CN'631 application").

In a 500 mL 4-neck reaction flask fitted with a stirrer, a N₂ inlet tube, a Claisen adapter with a thermocouple plunging in the reaction medium, and a Dean-Stark trap with a condenser and a dry ice trap were introduced 249.93 g of diphenyl sulfone, 39.790 g of 1,4-bis(4'-hydroxybenzoyl) benzene, 8.057 g of 1,4-bis(4'-fluorobenzoyl)benzene, 32.230 g of 1,3-bis(4'-fluorobenzoyl)benzene and 13.646 g of Na₂CO₃. The flask content was evacuated under vacuum and then filled with high purity nitrogen (containing less than 10 ppm O2). The reaction mixture was then placed under a constant nitrogen purge (60 mL/min).

The reaction mixture was heated to 120° C., then from 120° C. to 160° C. at 2° C./min. The mixture was then held at 160° C. for 1 h, heated up to 210° C. at 5° C./min and held at 210° C. for 1 h. The mixture was then heated up to 250° C. at 5° C./min and held at 250° C. for 1 h. The mixture was then heated up to 290° C. at 10° C./min and held at 290° C. for 2 h. The mixture was heated up to 310° C. at 10° C./min and held at 310° C. for 3 h. The reactor content was then poured from the reactor into a satinless steell pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 68 g of an off-white/yellow powder. The PEKK polymer had a T/I of 60/40 and can be represented as follows:

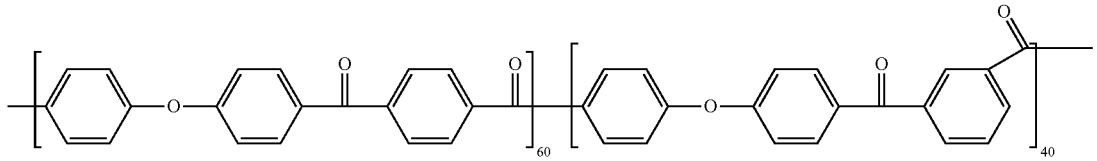

The PEKK polymer was analyzed as described above. The synthesis parameters and results of the analysis are displayed in Tables 1 to 3.

Comparative Example 2b: Synthesis and Analysis of PEKK with 60/40 T/I Ratio

This example demonstrates the synthesis of a PEKK polymer via a traditional nucleophilic synthetic route, according to the CN'631 application.

The same procedure as for Comparative Example 2a was followed but the reaction time at 310° C. was shortened to 2 hours to obtain a lower molecular weight polymer. The PEKK polymer was analyzed as described above. The synthesis parameters and results of the analysis are displayed in Tables 1 to 3.

Comparative Example 3: Synthesis and Analysis of PEKK with 60/40 T/I Ratio

This example demonstrates the synthesis of a PEKK polymer via a traditional nucleophilic synthetic route.

In a 500 mL 4-neck reaction flask fitted with a stirrer, a N₂ inlet tube, a Claisen adapter with a thermocouple plunging in the reaction medium, and a Dean-Stark trap with a condenser and a dry ice trap were introduced 107.38 g of diphenyl sulfone, 26.739 g of 1,3-bis(4'-hydroxybenzoyl) benzene, 6.685 g of 1,4-bis(4'-hydroxybenzoyl)benzene, 11.541 g of Na₂CO₃ and 0.073 g of K₂CO₃. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C., then held at 200° C. for 45 minutes. At 200° C., 33.165 g of 1,4-bis(4'-fluorobenzoyl)benzene was added via a powder dispenser to the reaction mixture over 30 minutes. At the end of the addition, the reaction mixture was heated to 320° C. at 1° C./minute. After 96 minutes at 320° C., 3.832 g of 1,4-bis(4'-fluorobenzoyl)benzene were added to the reaction mixture while keeping a nitrogen purge on the reactor. After 5 minutes, 0.445 g of lithium chloride were added to the reaction mixture. 10 minutes later, another 0.169 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 56 g of an off-white/yellow powder. The final polymer had a T/I ratio of 60/40. The PEKK polymer was analyzed as described above. The synthesis parameters and results of the analysis are displayed in Tables 1 to 3.

Comparative Example 4: Synthesis and Analysis of PEKK with 60/40 T/I Ratio

This example demonstrates the synthesis of a PEKK polymer via a traditional nucleophilic synthetic route.

The procedure of comparative example 3 was repeated except for the following. The monomer weights used were as follows: 1,3-bis(4'-hydroxybenzoyl)benzene, 26.739 g; 1,4-bis(4'-hydroxybenzoyl)benzene, 6.685 g; and 1,4-bis(4'-fluorobenzoyl)benzene, 33.842 g. Additionally, the end-capping procedure was different. In particular, at the end of the addition, the reaction mixture was heated to 320° C. at 1° C./minute. After 0 minutes at 320° C., 2.115 g of 1,4-bis(4'-fluorobenzoyl)benzene were added to the reaction mixture while keeping a nitrogen purge on the reactor. After 5 minutes, 0.445 g of lithium chloride were added to the reaction mixture. 10 minutes later, another 0.169 g of 1,4-bis(4'-fluorobenzoyl)benzene were added to the reactor and the reaction mixture was kept at temperature for 15 minutes. The powder obtained from the synthesis was off-white and had a weight of 56 g. The final polymer had a T/I ratio of 60/40.

The PEKK polymer was analyzed as described above. The synthesis parameters and results of the analysis are displayed in Tables 1 to 3.

Comparative Example 5: Synthesis and Analysis of PEKK with 60/40 T/I Ratio

This example demonstrates the synthesis of a PEKK polymer via a traditional nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.83 g of diphenyl sulfone, 31.832 g of 1,3-bis(4'-hydroxybenzoyl)benzene, 7.958 g of 1,4-bis(4'-hydroxybenzoyl)benzene, 13.977 g of $Na_2CO_3$ and 0.078 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 200° C. At 200° C., 40.771 g of 1,4-bis(4'-fluorobenzoyl)benzene was added via a powder dispenser to the reaction mixture over 30 minutes. At the end of the addition, the reaction mixture was heated to 320° C. at 1° C./minute. After 82 minutes at 320° C., 0.806 g of 1,4-bis(4'-fluorobenzoyl)benzene were added to the reaction mixture while keeping a nitrogen purge on the reactor. After 5 minutes, 0.371 g of lithium chloride were added to the reaction mixture. 10 minutes later, another 0.403 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 68 g of an off-white/yellow powder. The final polymer had a T/I ratio of 60/40.

The PEKK polymer was analyzed as described above. The synthesis parameters and results of the analysis are displayed in Tables 1 to 3.

Example 6: Synthesis and Analysis of PEKK with 60/40 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.83 g of diphenyl sulfone, 31.832 g of 1,3-bis(4'-hydroxybenzoyl)benzene, 7.958 g of 1,4-bis(4'-hydroxybenzoyl)benzene, 13.673 g of $Na_2CO_3$ and 0.078 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 200° C. At 200° C., 40.771 g of 1,4-bis(4'-fluorobenzoyl)benzene was added via a powder dispenser to the reaction mixture over 30 minutes. At the end of the addition, the reaction mixture was heated to 320° C. at 1° C./minute. After 7 minutes at 320° C., 1.612 g of 1,4-bis(4'-fluorobenzoyl)benzene were added to the reaction mixture while keeping a nitrogen purge on the reactor. After 5 minutes, 0.530 g of lithium chloride were added to the reaction mixture. 10 minutes later, another 0.403 g of 1,4-bis(4'-fluorobenzoyl)benzene were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of an off-white/yellow powder. The final polymer had a T/I ratio of 60/40.

The PEKK polymer was analyzed as described above. The synthesis parameters and results of the analysis are displayed in Tables 1 to 3.

Example 7: Synthesis and Analysis of PEKK with 60/40 T/I Ratio

This example demonstrates the synthesis of a PEKK polymer via a nucleophilic synthetic route.

The procedure of Example 6 was repeated, except adding 40.892 g of 1,4-bis(4'-fluorobenzoyl)benzene at 200° C. The PEKK polymer was analyzed as described above. The synthesis parameters and results of the analysis are displayed in Tables 1 to 3.

Example 8: Synthesis and Analysis of PEKK with 60/40 T/I Ratio

This example demonstrates the synthesis of a PEKK polymer via a nucleophilic synthetic route.

The procedure of Comparative Example 3 was repeated, except for the following. The monomer weights used were: 26.739 g of 1,3-bis(4'-hydroxybenzoyl)benzene; 6.685 g of 1,4-bis(4'-hydroxybenzoyl)benzene; and 34.078 g of 1,4-bis(4'-fluorobenzoyl)benzene. Additionally the end-capping procedure was different. After 12 minutes at 320° C., 0.423 g of 1,4-bis(4'-fluorobenzoyl)benzene were added to the reaction mixture while keeping a nitrogen purge on the reactor. After 5 minutes, 0.445 g of lithium chloride were added to the reaction mixture. 10 minutes later, another 0.169 g of 1,4-bis(4'-fluorobenzoyl)benzene were added to the reactor and the reaction mixture was kept at temperature for 15 minutes. The powder obtained from the synthesis was off-white and had a weight of 57 g. The final polymer had a T/I ratio of 60/40.

The PEKK polymer was analyzed as described above. The synthesis parameters and results of the analysis are displayed in the tables below.

Comparative Example 9: Analysis of PEKK Synthesized by Electrophilic Synthesis Route The following example demonstrates the analysis of PEKK synthesized using an electrophilic synthesis route. Cypek® FC was analyzed as described above, and the results are displayed in the tables below.

Comparative Examples 10 and 11: Synthesis and Analysis of PEKK with 70/30 T/I Ratio This example demonstrates the synthesis of a PEKK polymer via a traditional nucleophilic synthetic route, according to the CN'631 application.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 249.93 g of diphenyl sulfone, 39.790 g of 1,4-bis(4'-hydroxybenzoyl)benzene, 16.115 g of 1,4-bis(4'-fluorobenzoyl)benzene, 24.172 g of 1,3 bis(4'-fluorobenzoyl)benzene and 13.646 g of $Na_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated to 120° C., then from 120° C. to 160° C. at 2° C./min. The mixture was then held at 160° C. for 1 h, heated up to 210° C. at 5° C./min and held at 210° C. for 1 h. The mixture was then heated up to 250° C. at 5° C./min and held at 250° C. for 1 h. The mixture was then heated up to 290° C. at 10° C./min and held at 290° C. for 2 h. The mixture was heated up to 310° C. at 10° C./min and held at 310° C. for 3 h. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 68 g of an off-white/yellow powder. The final polymer had a T/I ratio of 70/30.

The PEKK polymer was analyzed as described above. The synthesis parameters and results of the analysis are displayed in the tables below.

Comparative Examples 12: Synthesis and Analysis of PEKK with 72/28 T/I Ratio

This example demonstrates the synthesis of a PEKK polymer via a traditional nucleophilic synthetic route, according to the CN'631 application.

The procedure of Comparative Examples 10 and 11 was repeated except for the monomer weights, which were as follows: 39.790 g of 1,4-bis(4'-hydroxybenzoyl)benzene; 17.726 g of 1,4-bis(4'-fluorobenzoyl)benzene; and 22.561 g of 1,3-bis(4'-fluorobenzoyl)benzene. The PEKK polymer had a T/I ratio of 72/28.

The PEKK polymer was analyzed as described above. The synthesis parameters and results of the analysis are displayed in the tables below.

Comparative Example 13: Synthesis and Analysis of PEKK with 70/30 T/I Ratio

This example demonstrates the synthesis of a PEKK polymer via a traditional nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced an initial charge of 127.83 g of diphenyl sulfone, 23.874 g of 1,3-bis(4'-hydroxybenzoyl)benzene, 15.916 g of 1,4-bis(4'-hydroxybenzoyl)benzene, 40.287 g of 1,4-bis(4'-fluorobenzoyl)benzene, 12.719 g of $Na_2CO_3$ and 1.632 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 200° C. and then from 200° C. to 320° C. at 1° C./minute. After 8 minutes at 320° C., the reactor content was poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 67 g of an off-white/yellow powder. The final polymer had a T/I ratio of 70/30.

The PEKK polymer was analyzed as described above. The synthesis parameters and results of the analysis are displayed in the tables below.

Comparative Example 14: Synthesis and Analysis of PEKK with 71/29 T/I Ratio

This example demonstrates the synthesis of a PEKK polymer via a traditional nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced an initial charge of 122.31 g of diphenyl sulfone, 29.540 g of 1,3-bis(4'-hydroxybenzoyl)benzene, 10.151 g of $Na_2CO_3$ and 0.100 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 200° C. At 200° C., a second charge of 30.268 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a third charge of a mixture of 21.919 g of 1,4-bis(4'-fluorobenzoyl)benzene, 21.391 g of 1,4-bis(4'-hydroxybenzoyl)benzene and 7.350 g of $Na_2CO_3$ was added slowly to the reaction mixture over 30 minutes.

At the end of the addition, the reaction mixture was heated to 320° C. at 1° C./minute. To end-cap the PEKK polymer, after 3 minutes at 320° C., 4.126 g of 1,4-bis(4'-fluorobenzoyl)benzene were added to the reaction mixture while keeping a nitrogen purge on the reactor. After 5 minutes, 0.679 g of lithium chloride were added to the reaction mixture. 10 minutes later, another 0.516 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 90 g of a yellow powder. The final polymer had a T/I ratio of 71/29.

The PEKK polymer was analyzed as described above. The synthesis parameters and results of the analysis are displayed in the tables below.

Comparative Example 15: Synthesis and Analysis of PEKK with 71/28 T/I Ratio

This example demonstrates the synthesis of a PEKK polymer via a traditional nucleophilic synthetic route.

The procedure of Comparative Example 13 was repeated, except for the following reagent weights: 127.83 g of diphenyl sulfone; 39.790 g of 1,4-bis(4'-hydroxybenzoyl)benzene; 13.309 g of $Na_2CO_3$; 0.864 g of $K_2CO_3$; 17.726 g of 1,4-bis(4'-fluorobenzoyl)benzene; and 22.561 g of 1,3-bis(4'-fluorobenzoyl)benzene. After 7 minutes at 320° C., discharge of reaction mixture. The final polymer weight (off-white powder) was 49 g and the final polymer had a T/I ratio of 71/28.

The PEKK polymer was analyzed as described above. The synthesis parameters and results of the analysis are displayed in the tables below.

Example 16: Synthesis and Analysis of PEKK with 71/29 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced an initial charge of 102.27 g of diphenyl sulfone, 18.463 g of 1,3-bis(4'-hydroxybenzoyl)benzene, 6.344 g of $Na_2CO_3$ and 0.062 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 200° C. At 200° C., a second charge of 18.918 g of 1,4-bis(4'-fluorobenzoyl)benzene, were added via a powder dispenser to the reaction mixture over 30 minutes. At the end of the addition, the reaction mixture was heated to 240° C. at 1° C./minute.

At 240° C., a third charge of a mixture of 13.699 g of 1,4-bis(4'-fluorobenzoyl)benzene, 13.370 g of 1,4-bis(4'-hydroxybenzoyl)benzene and 4.595 g of $Na_2CO_3$ was added slowly to the reaction mixture over 30 minutes.

At the end of the addition, the reaction mixture was heated to 320° C. at 1° C./minute. The end capping procedure was as follow: After 150 minutes at 320° C., 1.290 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 71/29. The PEKK polymer was analyzed as described above. The synthesis parameters and results of the analysis are displayed in the tables below.

Example 17: Synthesis and Analysis of PEKK with 71/29 T/I Ratio

This example demonstrates the synthesis of a PEKK polymer via a nucleophilic synthetic route.

The procedure of example 16 was followed except for the following:
Initial charge: 132.71 g of Diphenyl Sulfone; 29.540 g 1,3-bis(4'-hydroxybenzoyl)benzene; 10.151 g of $Na_2CO_3$; and 0.100 g of $K_2CO_3$;
Second Charge: 30.268 g of 1,4-bis(4'-fluorobenzoyl)benzene;
Third Charge: added at 240° C. were 21.391 g of 1,4-bis(4'-hydroxybenzoyl)benzene; 21.918 g of 1,4-bis(4'-fluorobenzoyl)benzene; and 7.350 g $Na_2CO_3$.

The final polymer had a T/I ratio of 71/29 and a weight of 90 g.

The PEKK polymer was analyzed as described above. The synthesis parameters and results of the analysis are displayed in the tables below.

Example 18: Synthesis and Analysis of PEKK with 71/29 T/I Ratio

This example demonstrates the synthesis of a PEKK polymer via a nucleophilic synthetic route.

The procedure of example 14 was followed except with the following:
Initial Charge: 126.13 g of diphenyl sulfone; 25.848 g 1,3-bis(4'-hydroxybenzoyl)benzene; 8.882 g of $Na_2CO_3$; and 0.087 g of $K_2CO_3$
Second Charge: 26.485 g of 1,4-bis(4'-fluorobenzoyl)benzene;
Third Charge: 18.717 g of 1,4-bis(4'-hydroxybenzoyl)benzene; 19.179 g of 1,4-bis(4'-fluorobenzoyl)benzene; 6.432 g $Na_2CO_3$;
End-Capping: After 12 minutes at 320° C., 3.610 g of 1,4-bis(4'-fluorobenzoyl)benzene; after another 5 minutes, 0.594 g of lithium chloride; after another 10 minutes, 0.451 g of 1,4-bis(4'-fluorobenzoyl)benzene.

The final polymer had a T/I ratio of 71/29 and a weight of 80 g.

The PEKK polymer was analyzed as described above. The synthesis parameters and results of the analysis are displayed in Tables 1 to 3.

Example 19: Synthesis and Analysis of PEKK with 71/29 T/I Ratio

This example demonstrates the synthesis of a PEKK polymer via a nucleophilic synthetic route.

The procedure of example 14 was followed except with the following:
Initial Charge: 129.91 g of diphenyl sulfone; 14.770 g 1,3-bis(4'-hydroxybenzoyl)benzene; 5.075 g of $Na_2CO_3$; and 0.050 g of $K_2CO_3$
Second Charge: 15.134 g of 1,4-bis(4'-fluorobenzoyl)benzene;
Third Charge: 10.696 g of 1,4-bis(4'-hydroxybenzoyl)benzene; 10.959 g of 1,4-bis(4'-fluorobenzoyl)benzene; 3.675 g $Na_2CO_3$;
End-Capping: After 9 minutes at 320° C., 2.063 g of 1,4-bis(4'-fluorobenzoyl)benzene; after another 5 minutes, 0.339 g of lithium chloride; after another 10 minutes, 0.258 g of 1,4-bis(4'-fluorobenzoyl)benzene.

The final polymer had a T/I ratio of 71/29 and a weight of 80 g.

The PEKK polymer was analyzed as described above. The synthesis parameters and results of the analysis are displayed in the tables below.

Example 20: Synthesis and Analysis of PEKK with 72/28 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 102.27 g of diphenyl sulfone, 31.832 g of 1,4-bis(4'-hydroxybenzoyl) benzene, 14.280 g of 1,4-bis(4'-fluorobenzoyl)benzene and 18.175 g of 1,3 bis(4'-fluorobenzoyl)benzene. The flask content was evacuated under vacuum and then filled with high purity nitrogen (containing less than 10 ppm O2). The reaction mixture was then placed under a constant nitrogen purge (60 mL/min).

The reaction mixture was heated slowly to 180° C. At 180° C., 11.023 g of $Na_2CO_3$ were added via a powder dispenser to the reaction mixture over 30 minutes. At the end of the addition, the reaction mixture was heated to 310° C. at 1° C./minute. After 150 minutes at 310° C., 0.645 g of 1,4-bis(4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 72/28.

The PEKK polymer was analyzed as described above. The synthesis parameters and results of the analysis are displayed in Tables 1 to 3.

Example 21: Synthesis and Analysis of PEKK with 72/28 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced an initial charge 102.27 g of diphenyl sulfone, 31.832 g of 1,4-bis(4'-hydroxybenzoyl)benzene, 14.280 g of 1,4-bis(4'-fluorobenzoyl)benzene and 18.175 g of 1,3-bis(4'-fluorobenzoyl)benzene. The flask content was evacuated under vacuum and then filled with high purity nitrogen (containing less than 10 ppm O2). The reaction mixture was then placed under a constant nitrogen purge (60 mL/min).

The reaction mixture was heated slowly to 180° C. At 180° C., a second charge of 11.023 g of $Na_2CO_3$ were added via a powder dispenser to the reaction mixture over 30 minutes. At the end of the addition, the reaction mixture was heated to 310° C. at 1° C./minute. To end-cap the PEKK polymer, after 150 minutes at 310° C., 0.645 g of 1,4-bis (4'-fluorobenzoyl)benzene were added to the reaction mixture while keeping a nitrogen purge on the reactor. After 5 minutes, 0.424 g of lithium chloride were added to the reaction mixture. 10 minutes later, another 0.323 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 52 g of an off-white/yellow powder. The final polymer had a T/I ratio of 72/28.

The PEKK polymer was analyzed as described above. The synthesis parameters and results of the analysis are displayed in the tables below.

Example 22: Synthesis and Analysis of PEKK with 72/28 T/I Ratio

This example demonstrates the synthesis of a PEKK polymer via a nucleophilic synthetic route.

The procedure of example 21 was followed except with the following:
Initial Charge: 102.27 g diphenyl sulfone; 14.006 g of 1,4-bis(4'-hydroxybenzoyl)benzene; 17.826 g of 1,3-bis(4'-hydroxybenzoyl)benzene; and 11.024 g of $Na_2CO_3$
Second Charge: 32.456 g of 1,4-bis(4'-fluorobenzoyl) benzene;
End-Capping: After 92 minutes at 310° C., 0.645 g of 1,4-bis(4'-fluorobenzoyl)benzene; after another 5 minutes, 0.426 g of lithium chloride; after another 10 minutes, 0.322 g of 1,4-bis(4'-fluorobenzoyl)benzene.
The final polymer had a T/I ratio of 72/28 and a weight of 54 g.
The PEKK polymer was analyzed as described above. The synthesis parameters and results of the analysis are displayed in the tables below.

Example 23: Synthesis and Analysis of PEKK with 71/29 T/I Ratio

This example demonstrates the synthesis of a PEKK polymer via a nucleophilic synthetic route.

The procedure of example 14 was followed except with the following:
Initial Charge: 102.72 g of diphenyl sulfone; 18.463 g 1,3-bis(4'-hydroxybenzoyl)benzene; 6.332 g of $Na_2CO_3$; and 0.040 g of $K_2CO_3$
Second Charge: 18.918 g of 1,4-bis(4'-fluorobenzoyl) benzene;
Third Charge: 13.369 g of 1,4-bis(4'-hydroxybenzoyl) benzene; 13.699 g of 1,4-bis(4'-fluorobenzoyl)benzene; 4.585 g $Na_2CO_3$; and 0.029 g of $K_2CO_3$
End-Capping: After 5 minutes at 320° C., 2.063 g of 1,4-bis(4'-fluorobenzoyl)benzene; after another 5 minutes, 0.339 g of lithium chloride; after another 10 minutes, 0.258 g of 1,4 bis(4'-fluorobenzoyl)benzene.
The final polymer had a T/I ratio of 71/29 and a weight of 54 g.
The PEKK polymer was analyzed as described above. The synthesis parameters and results of the analysis are displayed in the tables below.

Example 24: Synthesis and Analysis of PEKK with 71/29 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced an initial charge 102.27 g of diphenyl sulfone, 18.463 g of 1,3-bis(4'-hydroxybenzoyl)benzene, 6.363 g of $Na_2CO_3$ and 0.024 g of $K_2CO_3$. The flask content was evacuated under vacuum and then filled with high purity nitrogen (containing less than 10 ppm 02). The reaction mixture was then placed under a constant nitrogen purge (60 mL/min).

The reaction mixture was heated slowly to 180° C. At 180° C., a second charge of 18.918 g of 1,4-bis(4'-fluorobenzoyl)benzene, were added via a powder dispenser to the reaction mixture over 30 minutes. At the end of the addition, the reaction mixture was heated to 220° C. at 1° C./minute. At 220° C., a third charge containing a mixture of 13.699 g of 1,4-bis(4'-fluorobenzoyl)benzene, 13.369 g of 1,4-bis(4'-hydroxybenzoyl)benzene, 4.607 g of $Na_2CO_3$ and 0.017 g of $K_2CO_3$ was added slowly to the reaction mixture over 30 minutes.

At the end of the addition, the reaction mixture was heated to 320° C. at 1° C./minute. To end-cap the PEKK polymers, after 10 minutes at 320° C., 2.578 g of 1,4-bis(4'-fluorobenzoyl)benzene were added to the reaction mixture while keeping a nitrogen purge on the reactor. After 5 minutes, 0.213 g of lithium chloride were added to the reaction mixture. 10 minutes later, another 0.322 g of 1,4-bis(4'-fluorobenzoyl)benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 47 g of a off-white/yellow powder. The final polymer had a T/I ratio of 71/29.

The PEKK polymer was analyzed as described above. The synthesis parameters and results of the analysis are displayed in the tables below.

Example 25: Preparation of PEKK with 71/29 T/I Ratio

This example demonstrates the synthesis of a PEKK polymer via a nucleophilic synthetic route.

The procedure of example 24 was followed, except for the following:

Initial Charge: 102.27 g of Diphenyl sulfone; 13.369 g of 1,4-bis(4'-hydroxybenzoyl)benzene; 18.463 g of 1,3-bis(4'-hydroxybenzoyl)benzene; 10.938 g of $Na_2CO_3$; and 0.276 g of $K_2CO_3$ Second Charge: 32.617 g of 1,4-bis(4'-fluorobenzoyl)benzene End-Caping: after 5 minutes at 320° C., addition of 1.289 g 4-bis(4'-fluorobenzoyl)benzene; after another 5 min., addition of 0.426 g lithium chloride; and after another 10 min., addition of 0.322 g of 1,4-bis(4'-fluorobenzoyl)benzene.

The final polymer had a T/I ratio of 71/29 and a weight of 54 g.

The PEKK polymer was analyzed as described above. The synthesis parameters and results of the analysis are displayed in the tables below.

Example 26: Synthesis and Analysis of PEKK with 72/28 T/I Ratio

This example demonstrates the synthesis of a PEKK polymer via a nucleophilic synthetic route.

The procedure of example 13 was followed except with the following:

Initial Charge: 251.35 g of diphenyl sulfone; 39.790 g of 1,4-bis(4'-hydroxybenzoyl)benzene; 17.726 g of 1,4-bis(4'-fluorobenzoyl)benzene; 22.561 g of 1,3-bis(4'-fluorobenzoyl)benzene; 13.673 g of $Na_2CO_3$; and 0.078 g of $K_2CO_3$ After 32 minutes at 320° C., the reaction mixture was discharged The final polymer was an off-white powder having a weight of 74 g and a T/I ratio of 72/28.

The PEKK polymer was analyzed as described above. The synthesis parameters and results of the analysis are displayed in the tables below.

Results

Tables 1 and 2 display a summary of the synthesis conditions for each of the examples. In the tables, the following abbreviations are used: 14BHBB refers to 1,4-bis(4'-hydroxybenzoyl)benzene; 13BHBB refers to 1,3-bis(4'-hydroxybenzoyl)benzene; 14DFDK refers to 1,4-bis(4'-fluorobenzoyl) benzene; and 13DFDK refers to 1,3-bis(4'-fluorobenzoyl)benzene.

Example 27: Synthesis and Analysis of PEKK with 60/40 T/I Ratio

This example demonstrates the synthesis of a PEKK polymer via a nucleophilic synthetic route.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.50 g of diphenyl sulfone, 33.390 g of 1,3-bis(4'-hydroxybenzoyl) benzene, 6.360 g of 1,4-bis(4'-hydroxybenzoyl)benzene and 40.810 g of 1,4-bis(4'-fluorobenzoyl)benzene. The flask content was evacuated under vacuum and then filled with high purity nitrogen (containing less than 10 ppm 02). The reaction mixture was then placed under a constant nitrogen purge (60 mL/min).

The reaction mixture was heated slowly to 280° C. At 280° C., 13.743 g of $Na_2CO_3$ and 0.086 g of $K_2CO_3$. was added via a powder dispenser to the reaction mixture over 60 minutes. At the end of the addition, the reaction mixture was heated to 320° C. at 1° C./minute. After 100 minutes at 320° C., 1.207 g of 1,4-bis(4'-fluorobenzoyl)benzene were added to the reaction mixture while keeping a nitrogen purge on the reactor. After 5 minutes, 0.530 g of lithium chloride were added to the reaction mixture. 10 minutes later, another 0.503 g of 1,4-bis(4'-fluorobenzoyl)benzene were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of an off-white/yellow powder. The final polymer had a T/I ratio of 60/40.

The PEKK polymer was analyzed as described above. The synthesis parameters and results of the analysis are displayed in Tables 1 to 3.

TABLE 1

| Example | mol % 14BHBB (relative to mol 13BHBB + 14BHBB) | [monomers] (wt %) | mol Na₂CO₃; mol K₂CO₃ (relative to mol 13BHBB + 14BHBB) | % XS DFDK | Add#1 (reagent, T in ° C.) | Σ |
|---|---|---|---|---|---|---|
| CE1 | | | | | | |
| CE2a | 100 | 25 | 1.030/0.00 | 0.0 | | 7* |
| CE2b | 100 | 25 | 1.030/0.00 | 0.0 | | 7* |
| CE3 | 20 | 39 | 1.037/0.0050 | −2.0 | DFDK, 200 | 4.2* |
| CE4 | 20 | 39 | 1.037/0.0050 | 0.0 | DFDK, 200 | 2.2* |
| CE5 | 20 | 39 | 1.055/0.0045 | 1.2 | DFDK, 200 | 3.1* |
| 6 | 20 | 39 | 1.032/0.0045 | 1.2 | DFDK, 200 | 0.8 |
| 7 | 20 | 39 | 1.032/0.0045 | 1.5 | DFDK, 200 | 0.5 |
| 8 | 20 | 39 | 1.037/0.0050 | 2.5 | DFDK, 200 | −0.3 |
| 27 | 16 | 42 | 1.037/0.0050 | 1.4 | Carbonates, 280 | 1.6 |

TABLE 2

| Example | T/I | mol % 14BHBB (relative to mol 13BHBB + 14BHBB) | [monomers] (wt %) | mol Na₂CO₃; mol K₂CO₃ (relative to mol 13BHBB + 14BHBB) | % XS DFDK | Add#1 (reagent, T in ° C.) | Σ |
|---|---|---|---|---|---|---|---|
| CE9 | | | | | | | |
| CE10 | 70/30 | 100 | 25 | 1.030/0.0000 | 0 | | 7.0* |
| CE11 | 70/30 | 100 | 25 | 1.030/0.0000 | 0 | | 7.0* |
| CE12 | 72/28 | 100 | 25 | 1.030/0.0000 | 0 | 0 | 7.0* |
| CE13 | 70/30 | 42 | 39 | .960/0.09450* | 0 | 0 | 42.2* |
| CE14 | 71/29 | 42 | 48* | 1.032/0.00450 | 1.2 | DFDK, 200 | 3.1 |
| CE15 | 72/28 | 100 | 39 | 1.005/0.050* | 0.0 | 0 | 20.0* |
| 16 | 71/29 | 42 | 39 | 1.032/0.0045/1 | 1.2 | DFDK, 200 | 0.8 |
| 17 | 71/29 | 42 | 44 | 1.032/0.0045/1 | 1.2 | DFDK, 200 | 2.1 |
| 18 | 71/29 | 42 | 42 | 1.032/0.0045/1 | 1.2 | DFDK, 200 | 1.6 |
| 19 | 71/29 | 42 | 29 | 1.032/0.0045/1 | 1.2 | DFDK, 200 | 2.3 |
| 20 | 72/28 | 100 | 39 | 1.040/0.000/1 | 0.7 | Na2CO3, 180 | 4.8 |
| 21 | 72/28 | 72 | 39 | 1.040/0.000/1 | 0.7 | DFDK, 180 | 4.8 |
| 22 | 72/28 | 44 | 39 | 1.040/0.000/1 | 0.7 | DFDK, 180 | 4.8 |
| 23 | 71/29 | 42 | 39 | 1.030/0.0040/1 | 1.2 | DFDK, 200 | 0.9 |
| 24 | 71/29 | 42 | 39 | 1.035/0.0030/1 | 1.2 | DFDK, 180 | 2.0 |
| 25 | 71/29 | 42 | 39 | 1.032/0.020/1 | 1.2 | DFDK, 180 | 3.5 |
| 26 | 72/28 | 100 | 25 | 1.032/0.0045/1 | 0.0 | 0 | 4.5 |

Referring to Tables 1 and 2, the column "Add #1" refers to the addition of a reagent in the reaction mixture after the initial charge and before the end-capping procedure (during a first heating). The PEKK polymers made by a nucleophilic route in Table 1 have a T/I ratio of 60/40, while those in Table 2 vary from 70/30 to 72/28. Additionally, in Tables 1 and 2, as well as Tables 3-6 below, values denoted with an "*" indicate values that do not satisfy the prescribed quantities according to Formulae (EQ1)-(EQ4).

The physical and mechanical properties of the synthesized PEKK polymers corresponding to the samples of Tables 1 and 2 are displayed in Tables 3-6. In Tables 3 and 4, values denoted with a "†" indicate a ΔMV that is greater than 0.

TABLE 3

| | Example | | | | | | | | | |
|---|---|---|---|---|---|---|---|---|---|---|
| | CE1 | CE2a | CE2b | CE3 | CE4 | CE5 | 6 | 7 | 8 | 27 |
| Σ | | 7* | 7* | 4.2* | 2.2* | 3.1* | 0.8 | 0.5 | −0.3 | 1.6 |
| $\eta_{inh}$ (dL/g) | 1.07 | 1.70 | 1.31 | 1.15 | 1.31 | 1.35 | 1.28 | 1.58 | 1.26 | 0.94 |
| MV (410° C.) | 753 | 9225 | 3563 | 19328 | 3260 | 3941 | 2622 | 5832 | 2198 | 575 |
| $MV^{exp}$ (Pa · s) 1006 IV^3.9 | | 7968 | 2884 | 1735 | 2884 | 3243 | 2634 | 5989 | 2478 | 790 |
| ΔMV-$MV^{exp}$ (Pa · s) | | 1257† | 679† | 17593† | 376† | 698† | −12 | −157 | −280 | −215 |
| Tensile strength at yield (psi) | 11800 | 12200 | 12200 | | | 11900 | 12800 | 11670 | | 13100 |
| Elong at yield (%) | 5.0 | 5.5 | 5.5 | | | 5.2 | 5.2 | 5.2 | | 4.7 |
| Elong at break (%) | 35 | 36 | 36 | | | 40 | 43 | 51 | | 12 |
| Tensile modulus (kpsi) | 421 | 421 | 421 | | | 419 | 445 | 420 | | 478 |
| [Cl] (ppm) | 5750 | <70 | <70 | | | | <70 | 28 | 21 | |
| Td(1%) (° C.) | 365 | 517 | 528 | | | | 528 | 516 | 543 | 530 |

TABLE 4

| | Example | | | | | | |
|---|---|---|---|---|---|---|---|
| | CE9 | CE10 | CE11 | CE12 | CE13 | CE14 | CE15 |
| Σ | | 7.0* | 7.0* | 7.0* | 42.2* | 3.1 | 20.0* |
| Add #1 (reagent, T in ° C.) | | | | 0 | 0 | DFDK, 200 | 0 |
| $\eta_{inh}$ (dL/g) | 1.00 | 1.54 | 1.52 | 1.95 | 1.06 | 1.11 | 1.33 |
| MV (380° C.) | 520 | 9123 | 8151 | >30000 | 1875 | 4203 | 6655 |
| Exp MV (Pa · s) | 1490 | 8297 | 7876 | 21219 | 1877 | 2255 | 4636 |
| ΔMV (Pa · s) | −970 | 826† | 275† | >8781† | −2† | 1948† | 2019† |
| Td(1%) (° C.) | 3733 | 514 | | 511 | | | |
| [Cl] (ppm) | 1825 | | | | | | |
| Tensile strength at yield (psi) | 16000$^a$ | 11500 | 14996 | 12900 | 16200 | 17161 | |
| Elong at yield (%) | 0 | 5.5 | 5.0 | 5.3 | 4.6 | 4.2 | |
| Elong at break (%) | 3.0 | 45 | 24 | 29 | 16 | 6.4 | |
| Tensile modulus (kpsi) | 666 | 408 | 525 | 442 | 561 | 602 | |

TABLE 5

| | Example | | | | |
|---|---|---|---|---|---|
| | 16 | 17 | 18 | 19 | 20 |
| Σ | 0.8 | 2.1 | 1.6 | 2.3 | 4.8 |
| Add#1 (reagent, T in ° C.) | DFDK, 200 | DFDK, 200 | DFDK, 200 | DFDK, 200 | Na$_2$CO$_3$, 180 |
| $\eta_{inh}$ (dL/g) | 0.82 | 1.02 | 0.91 | 1.28 | 0.83 |
| MV (380° C.) | 503 | 1527 | 919 | 3587 | 618 |
| Exp MV (Pa · s) | 676 | 1611 | 1023 | 3976 | 710 |
| ΔMV (Pa · s) | −173 | −84 | −104 | −389 | −92 |
| Td(1%) (° C.) | 510 | | | | |
| [Cl] (ppm) | 53 | | | | |
| Tensile strength at yield (psi) | 17300 | | 17300 | N/A | |
| Elong at yield (%) | 4.6 | | 4.4 | N/A | |
| Elong at break (%) | 10 | | 6.9 | N/A | |
| Tensile modulus (kpsi) | 594 | | 621 | N/A | |

TABLE 6

| | Example | | | | | |
|---|---|---|---|---|---|---|
| | 21 | 22 | 23 | 24 | 25 | 26 |
| Σ | 4.8 | 4.8 | 0.9 | 2.0 | 3.5 | 4.5 |
| Add#1 (reagent, T in ° C.) | DFDK, 180 | DFDK, 180 | DFDK, 200 | DFDK, 180 | DFDK, 180 | 0 |
| $\eta_{inh}$ (dL/g) | 1.11 | 1.30 | 0.82 | 0.89 | 0.84 | 1.51 |
| MV (380° C.) | 1415 | 2224 | 494 | 710 | 583 | 6142 |
| Exp MV (Pa · s) | 2255 | 4229 | 676 | 937 | 744 | 7683 |
| ΔMV (Pa · s) | −840 | −2005 | −182 | −227 | −161 | −1541 |
| Td(1%) (° C.) | | 511 | | | | |
| [Cl] (ppm) | | | | | | |
| Tensile strength at yield (psi) | | | 16500 | 16700 | | |
| Elong at yield (%) | | | 4.6 | 6.1 | | |
| Elong at break (%) | | | 10 | 11 | | |
| Tensile modulus (kpsi) | | | 704 | 690 | | |

Referring to Tables 1 to 6, the PEKK polymers synthesized using the reaction components within the prescribed quantities (i.e., according to Formula (EQ1) to (EQ4)) had a unexpectedly lower melt viscosity ("MV") for a given $\eta_{inh}$, relative to PEKK polymers synthesized using reaction components outside the prescribed quantities. The ΔMV was determined according to Formula (E1) and (E2). The expected MV, MV (e), for (comparative) examples 1 to 8 and 27 (T/I ratio within the range 55/45 to 65/35) were determined by measuring and plotting MV vs. $\eta_{inh}$ for the PEKK polymers of comparative examples 1 to 5 and fitting to the curve MV=$m_{mv}\eta_{inh}^{n}$. Similarly, the expected MV, MV (e), for (comparative) examples 9 to 26 (T/I ratio within the range of greater than 65/35 to 75/25) were determined by measuring and plotting MV vs. $\eta_{inh}$ for the PEKK polymers of comparative examples 9 to 15 and fitting to the curve MV=$m_{mv}\eta_{inh}^{n}$. For the PEKK polymers of (comparative) examples 1 to 8 and 27, $m_{mv}$=1006 (Pa·s)(g/dL)$^{3.90}$ and n=3.90; and for the PEKK polymers of comparative examples 9 to 26, $m_{mv}$=1490 (Pa·s)(g/dL)$^{3.98}$ and n=3.98.

Referring to Tables 1 and 3 (PEKK polymers having a T/I ratio from 55/45 to 65/35), the PEKK polymers synthesized using reaction components within the prescribed quantities had an unexpectedly lower MV for a given $\eta_{inh}$, relative to the PEKK polymers synthesized using reaction components outside the prescribed quantities. For example, the PEKK polymers of examples 6 to 8 and 27 had a ΔMV that was −2 Pa·s or less. In contrast, the ΔMV for each of comparative examples 2 to 5 had a ΔMV that was greater than −2 Pa·s. It is noted that for examples 6 to 8 and 27, Σ<2.0 (reaction components within the prescribed quantities for T/I ratio from 55/45 to 65/35), while for Comparative Examples 2 to 5, Σ>2.0 (reaction components outside the prescribed quantities for T/I ratio from 55/45 to 65/35). Referring to Tables 2 and 4-6, similar results were seen for PEKK polymers having a T/I ratio greater than 65/35 to 75/25. In particular, examples 16 to 26 each had a ΔMV that was less than −2 Pa·s, while Comparative Examples 10 to 15 each had a ΔMV that was greater than −2 Pa·s. Again, it is noted that for examples 16 to 26, Σ<6.0 (reaction components within the prescribed quantities for T/I ratio more than 65/35 to 75/25) and, for Comparative Examples 10 to 13 and 15, Σ>6.00 (outside the prescribed quantities for T/I ratio more than 65/35 to 75/25). Comparative Example 14, on the other hand, had a Σ<6.0, but a ΔMV of 1948 Pa·s (significantly greater than −2 Pa·s). However, the % Monomers in the synthesis method of Comparative Example 14 was 48 wt. %, outside the prescribed range of from 25 wt. % to 44 wt. %, indicated in Formula (EQ4).

Furthermore, referring to Tables 1 and 3, the PEKK polymers of examples 6 to 8 had significantly increased elongation at break, relative to comparative examples 2 to 5, while exhibiting a lower MV. In particular, the elongation at break for examples 6 and 7 was 43% and 51%, respectively, while that of the comparative examples 2 to 5 ranged from 35% to 40%.

Additionally, for the PEKK polymers tested, the PEKK polymers synthesized via a nucleophilic route had improved improved Td(1%), relative to PEKK polymers synthesized via a electrophilic route. Referring to Tables 1 and 3, the Td(1%) for the PEKK polymer of examples 6 to 8 and 27 was higher than 500° C., while that of the PEKK polymers of comparative example 1, was 365° C. Similarly, referring to Tables 2 and 4-6, Td(1%) for the PEKK polymer or examples 16 and 22 was 510° C. and 511° C., respectively ° C., while that of the PEKK polymers of comparative example 9, was 373° C. Additionally, relative to PEKK polymers synthesized using an electrophilic route, the PEKK polymers described herein have significantly reduced residual chlorine content. For example, examples 7 and 8 (nucleophilic synthesis route) had at least a 99.5% reduction in residual chlorine, relative to Comparative Example 1 (electrophilic synthesis route). Similarly, example 16 (nucleophilic synthesis route) had a 97.1% reduction in residual chlorine, relative to Comparative Example 9 (electrophilic synthesis route).

Should the disclosure of any patents, patent applications, and publications which are incorporated herein by reference conflict with the description of the present application to the extent that it may render a term unclear, the present description shall take precedence.

The invention claimed is:

1. A method of forming a poly (ether ketone ketone), (PEKK) polymer, comprising at least one recurring unit ($R^M$PEKK) and at least one recurring unit ($R^P$PEKK), the method comprising:
reacting, in a reaction mixture, a blend of one or more bis(hydroxybenzoyl) benzene monomer and one or more bis (halobenzoyl) benzene monomers in the presence of $Na_2CO_3$, $K_2CO_3$ and a solvent, wherein $$\Sigma = (\% \ Na_2CO_3 - 105) + 6* |\% \ K_2CO_3 - 1| + 0.25* |37 - \% \ Monomers| - \% \ XS_{DFDK}, \quad (EQ1)$$

$$0\% \leq \% \ K_2CO_3 < 5\%, \quad (EQ2),$$

$$0\% \leq \% \ XS_{DFDK}, \quad (EQ3) \ and$$

$$25\% \leq \% \ Monomers \leq 44\%, \quad (EQ4)$$

wherein:
$\Sigma < 6$
% $Na_2CO_3$ is the concentration, in mol %, of $Na_2CO_3$, relative to the number of moles of the one or more bis(hydroxybenzoyl) benzene monomers;
% $K_2CO_3$ is the concentration, in mol %, of $K_2CO_3$, relative to the number of moles of the one or more bis(hydroxybenzoyl) benzene monomers and where % $K_2CO_3$ ranges from 0 mol % to less than 5 mol %;
% Monomers is the total concentration, in wt. %, of the one or more bis(hydroxybenzoyl) benzene monomers and the one or more bis(halobenzoyl) benzene monomers, relative to the total weight of the one or more bis(hydroxybenzoyl) benzene monomers, the one or more bis(halobenzoyl) benzene monomers and solvent and where % Monomers is from 25 wt. % to 44 wt. %
% $XS_{DFDK}$ is the concentration, in mol %, of the one or more bis(halobenzoyl) benzene monomers in excess of an equimolar concentration of the one or more bis(hydroxybenzoyl) benzene monomers, and wherein,
each bis(hydroxybenzoyl) benzene monomer and each bis(halobenzoyl) benzene monomer is distinctly and independently represented by a formula selected from the following group of formulae:

$$X^5\text{-}M_m\text{-}X^5, \quad \text{formula (13) and}$$

$$X^6\text{-}M_p\text{-}X^6, \quad \text{formula (14)}$$

wherein $X^5$ and $X^6$ are an -OH for bis(hydroxybenzoyl) benzene monomers and $X^5$ and $X^6$ are a halogen for bis(halobenzoyl) benzene monomers, and
$M_m$ and $M_p$ are represented by the following formulae, respectively,

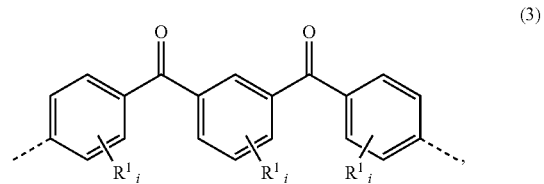

(3)

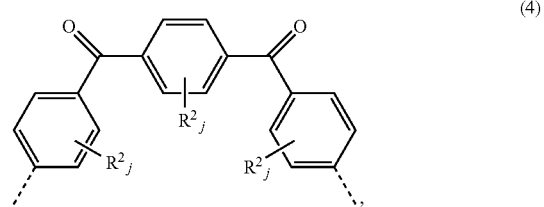

(4)

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4 and
wherein the ratio of the total number of moles of 1,4-bis (hydroxybenzoyl) benzene monomers and 1,4-bis(halobenzoyl) benzene monomers that are represented by Formula (14) to the total number of moles of 1,3-bis (hydroxybenzoyl) benzene monomers and 1,3-bis(halobenzoyl) benzene monomers that are represented by Formula (13) ("$(R^P_{PEKK})/(R^M_{PEKK})$ ratio") is from 55/45 to 75/25 and wherein
each recurring unit ($R^M_{PEKK}$) and each recurring unit ($R^P_{PEKK}$) are represented by the following formulae, respectively, $$\text{-}[\text{-}M_m\text{-O-}]\text{-}, \quad \text{formula (1) and}$$

$$\text{-}[\text{-}M_p\text{-O-}]\text{-} \quad \text{formula (2)}.$$

2. The method of claim 1, wherein % $K_2CO_3 > 0$ mol %.

3. The method of claim 1, wherein % $Na_2CO_3 + \% \ K_2CO_3 \leq 106.0$ mol %.

4. The method of claim 1, wherein 0.1 mol % ≤ % XSDFDK ≤ 4.0 mol %.

5. The method of claim 1, wherein the reacting further comprises a first heating including heating the reaction mixture to maintain its temperature within a first temperature range of from 180° C. to 270°° C.

6. The method of claim 5, wherein the first heating comprises maintaining the temperature of the reaction mixture with a first temperature range of from 180° C. to 270° C. for a first time period of from 5 min. to 300 min.

7. The method of claim 5, wherein the reacting further comprises a second heating, subsequent to the first heating, wherein the second heating comprises heating the reaction mixture to a temperature from 300° C. to 340° C.

8. The method of claim 7, wherein the second heating further comprises maintain the reaction mixture within a second temperature range from 300° C. to 340° C. for a second period of time ranging from less than 1 min. to 240 min., preferably to 180 min, most preferably to 120 min.

9. The method of claim 7, wherein the second heating further comprises adding an end-capping agent to the reaction mixture, the end-capping agent is selected from the group consisting of:

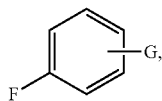
(15)

an excess of the one or more bis(halobenzoyl) benzene monomers, and a combination thereof, wherein G is -C(O)-Ar or S(O2)-Ar, and Ar is an arylene group.

10. The method of claim 1, wherein
(a) the $(R^P_{PEKK})/(R^M_{PEKK})$ ratio is greater than 65/35 to 75/25, and
(b) $\Delta MV$ that is no more than $-2$ Pa's, wherein $$\Delta MV = MV - MV^{(e)}, \quad (E1) \text{ and}$$

$$MV^{(e)} = m_{mv} \eta_{inh}^n, \quad (E2)$$

wherein:
MV is the melt viscosity measured according to ASTM D3835 at 380° C. and 46 s-1 with a die diameter =1.016 mm, length =20.32 mm, cone angle=120°
$\eta_{inh}$ is the inherent viscosity measured according to ASTM D2857 using a testing temperature of 30° C. and a testing solution comprising 0.5 wt./vol. % solution of the PEKK polymer in concentrated $H_2SO_4$, and $m_{mv}=1490$ $(Pa\cdot s)(g/dL)^{3.98}$ and n=3.98.

11. The method of claim 1, wherein
(a) the $(R^P_{PEKK})/(R^M_{PEKK})$ ratio is from 55/45 to 65/35,
(b) $\Sigma < 2$, and
(c) $\Delta MV$ that is no more than $-2$ Pa·s, wherein $$\Delta MV = MV - MV^{(e)} \quad (E1) \text{ and}$$

$$MV^{(e)} = m_{mv} \eta_{inh}^n, \quad (E2)$$

wherein:
MV is the melt viscosity measured according to ASTM D3835 at 410° C. and 46 s-1 with a die diameter=1.016 mm, length=20.32 mm, cone angle=120°,
$\eta_{inh}$ is the inherent viscosity measured according to ASTM D2857 using a testing temperature of 30° C. and a testing solution comprising 0.5 wt./vol. % solution of the PEKK polymer in concentrated H2SO4, and $m_{mv}=1006$ $(Pa\cdot s)(g/dL)^{3.90}$ and n=3.90.

12. The method of claim 1, wherein a first monomer of either the one or more bis(hydroxybenzoyl) benzene monomers or the one or more bis(halobenozyl) benzene monomers is represented by a formula $$X^1 - M^{1*}_m - X^1, \quad \text{formula (16)}$$

and wherein a second monomer, third monomer and fourth monomer of either the one or more bis(hydroxybenzoyl) benzene monomers or the one or more bis(halobenozyl) benzene monomers are respectively represented by the following formulae:

$$X^2 - M^{1*}_p - X^2, \quad \text{formula (17)}$$

$$X^3 - M^{2*}_p - X^3, \quad \text{formula (18) and}$$

$$X^4 - M^{3*}_p - X^4, \quad \text{formula (19)}$$

wherein
(a) $X^1$ is an -OH or halogen,
(b) $X^2$ is a halogen if $X^1$ is -OH and $X^2$ is an -OH if $X^1$ is a halogen
(c) $X^3$ is -OH or a halogen and
(d) $X^4$ is a halogen if $X^3$ is an -OH and $X^4$ is -OH if $X^3$ is a halogen and wherein
(a) $M^{1*}_m$, $M^{1*}_p$, $M^{2*}_p$, and $M^{3*}_p$ are represented by the following formulae, respectively:

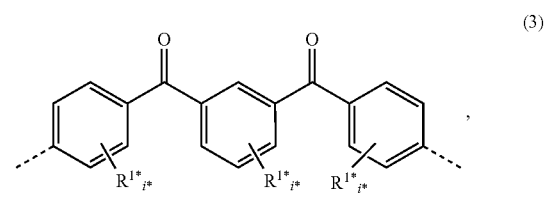
(3)

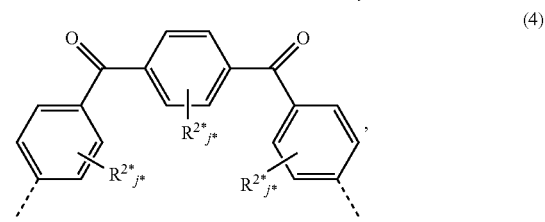
(4)

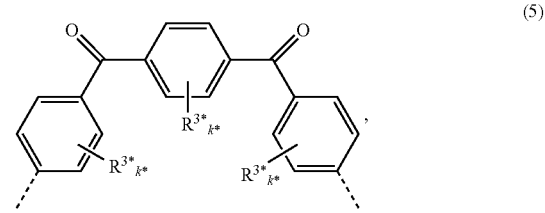
(5)

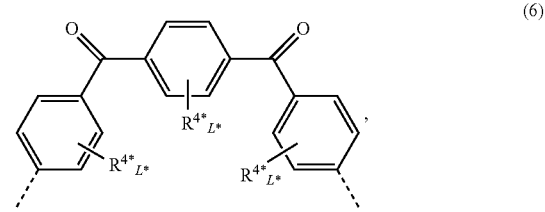
(6)

wherein
$R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and $i^*$, $j^*$, $k^*$ and $L^*$, at each instance, is an independently selected integer ranging from 0 to 4; and wherein
the at least one recurring unit $(R^M_{PEKK})$ comprises a recurring unit $(R^{M1}_{PEKK})$ represented by the formula:

$$-[-M^{1*}_m-O-]-, \quad \text{formula (5) and}$$

the at least one recurring unit $(R^P_{PEKK})$ comprises recurring units $(R^{P1}_{PEKK})$, $(R^{P2}_{PEKK})$, and $(R^{P3}_{PEKK})$, represented by the following formula, respectively:

$-[-M^{1*}{}_p\text{-O-}]-,$ formula (6)

$[-M^{2*}{}_p\text{-O-}]-,$ formula (7) and $[-M^{3*}{}_p\text{-O-}]-,$ formula (8).

13. The method of claim 12, wherein the ratio of the number of moles of recurring units ($R^{P1}{}_{PEKK}$), ($R^{P2}{}_{PEKK}$), and ($R^{P3}{}_{PEKK}$) to the number of moles of recurring unit ($R^{M1}{}_{PEKK}$) is greater than 65/35 to 75/25 or from 55/45 to 65/35.

14. The method of claim 12, wherein
   (a) the concentration of recurring unit ($R^{M1}{}_{PEKK}$) is at least 80 mol %, relative to the total number of moles of recurring units ($R^{M}{}_{PEKK}$) and
   (b) the total concentration of recurring units ($R^{P1}{}_{PEKK}$), ($R^{P2}{}_{PEKK}$), and ($R^{P3}{}_{PEKK}$) is at least 80 mol %, relative to the total number of moles of recurring units ($R^{P}{}_{PEKK}$) or wherein
   (a) the total concentration of recurring units ($R^{M}{}_{PEKK}$) and ($R^{P}{}_{PEKK}$) is at least 80 mol %, relative to the total number of moles of recurring units in the PEKK polymer.

15. The method of claim 1, wherein $X^5$ and $X^6$ are Cl and F for bis(halobenzoyl) benzene monomers.

* * * * *